US006774808B1

(12) United States Patent
Hibbs et al.

(10) Patent No.: US 6,774,808 B1
(45) Date of Patent: *Aug. 10, 2004

(54) ELECTROMECHANICAL LOCK FOR COMPONENTS

(75) Inventors: Richard N. Hibbs, Palo Alto, CA (US); Ian C. Fry, Danville, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,149

(22) Filed: May 17, 2000

(51) Int. Cl.[7] .............................................. G08B 21/00
(52) U.S. Cl. ..................... 340/686.4; 70/277; 361/685
(58) Field of Search ............................ 340/540, 686.4, 340/568.1, 542; 361/683, 385, 752; 70/277; 439/153, 152, 159, 160; 710/302, 304

(56) References Cited

U.S. PATENT DOCUMENTS

| | | | | |
|---|---|---|---|---|
| 4,656,848 A | * | 4/1987 | Rose ............................... 70/58 |
| 4,925,397 A | * | 5/1990 | Mirand et al. ............... 439/353 |
| 5,442,513 A | * | 8/1995 | Lo ............................... 361/685 |
| 5,483,419 A | * | 1/1996 | Kaczeus, Sr. et al. ....... 361/685 |
| 5,509,731 A | * | 4/1996 | Callahan et al. ............ 312/9.22 |
| 5,557,499 A | * | 9/1996 | Reiter et al. ................. 361/685 |
| 5,600,539 A | * | 2/1997 | Heys, Jr. et al. ............. 361/684 |
| 5,692,208 A | * | 11/1997 | Felcman et al. ......... 361/683 X |
| 5,751,551 A | * | 5/1998 | Hileman et al. ............. 361/753 |
| 5,791,753 A | * | 8/1998 | Paquin ..................... 312/332.1 |
| 5,831,821 A | * | 11/1998 | Scholder et al. ............ 361/686 |
| 5,857,364 A | * | 1/1999 | Hsu et al. ...................... 70/120 |
| 5,914,855 A | * | 6/1999 | Gustafson et al. .......... 361/685 |
| 6,252,514 B1 | * | 6/2001 | Nolan et al. ............. 340/686.4 |

* cited by examiner

*Primary Examiner*—Thomas Mullen
(74) *Attorney, Agent, or Firm*—Hamilton & Terrile, LLP; Stephen A. Terrile

(57) ABSTRACT

A mechanism that prevents premature disengagement of a component from a computer system is provided. Through a graphical user interface, the user signals to logic associated with the computer system to ready a component for removal from the computer system chassis. A trigger recessed in a handle is depressed to mechanically free the handle to pivot from the engaged position outward. The trigger activates a lock, which is coupled to logic associated with the computer system, which is capable of deactivating the lock. The lock prevents disengagement of the component from the computer system by preventing a handle arm, to which the handle is attached, from pivoting outward. When the lock is deactivated, the handle arm is actually free to pivot. When pivoting, the handle arm engages a hub, which rotates as the handle arm pivots. The hub is coupled to a first lever arm which moves and pivots a first engagement member. This engagement member may include a catch which engages insertion and extraction stops mounted on the chassis of the computer system. In one aspect of the invention, the action of the first lever arm and first engagement member may be substantially balanced by a second lever arm and second engagement member. In another aspect of the invention, an indicator light may be provided on or proximate to the component, to signal the user which component is ready for removal, decreasing the chance that the wrong component will be removed.

50 Claims, 17 Drawing Sheets

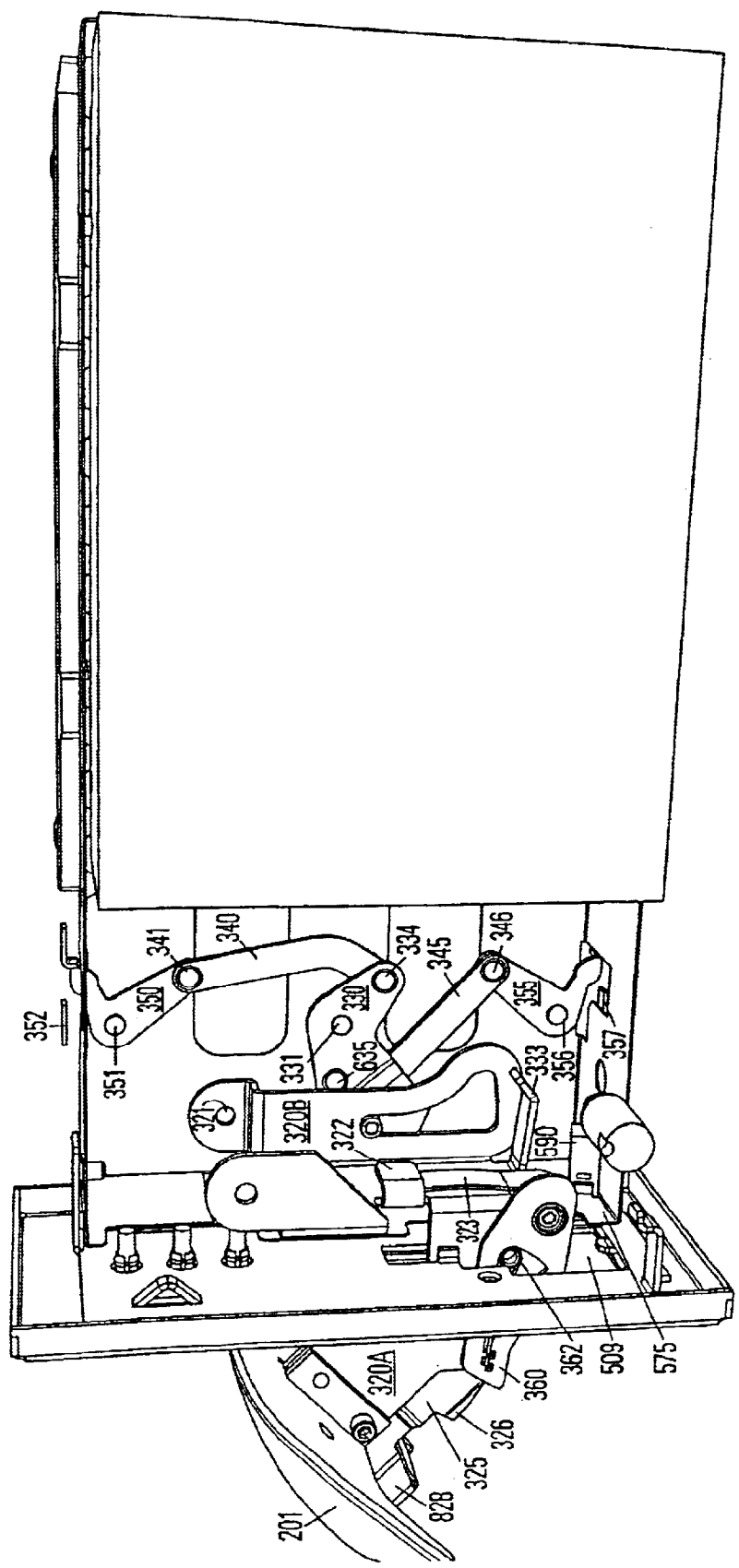

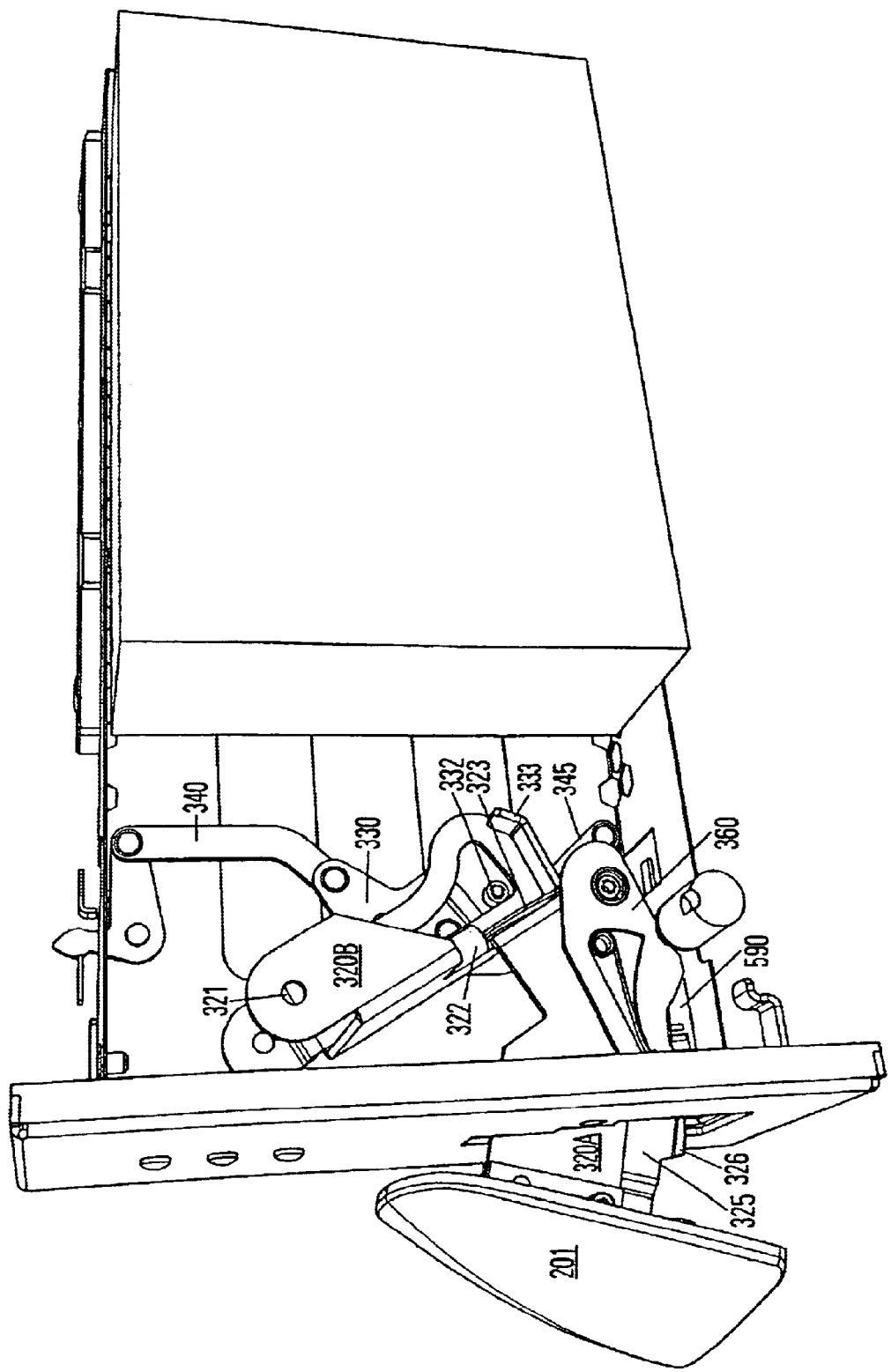

ELECTROMECHANICAL LOCK FOR COMPONENTS

BACKGROUND OF THE INVENTION

1. Field of the Invention

The present invention relates to mechanical and electrical apparatus for connecting and disconnecting components of a computer system. More particularly, the present invention relates to a mechanism engaging and disengaging components from the system while it is operating.

2. Description of Related Art

Computer systems such as file servers and storage servers in computer networks are relied upon by large numbers of users. When a file server or storage server is out of operation, for example, because of maintenance or service, many people are inconvenienced. Thus, technology has been developed which supports maintenance and service of computer systems while they remain operational. One part of maintenance and service includes the replacement of components. So-called "hot swap" technology allows the replacement of components without turning off the power or resetting the computer system as a whole.

Typical hot swap technology employs resources for signaling the system and components in the system about an intention to remove or replace a component. Also, the technology includes routines that stabilize communications among the components, and manage the distribution of power to components during the exchange.

The exchange of components on computer systems for maintenance and repair requires human operators. Human operators are prone to misuse or abuse the mechanical and electrical resources associated with hot swap technology. For example, an operator may attempt to withdraw a component from a computer chassis without first executing hot swap electrical routines to prepare the component. Also, when a system includes multiple interchangeable components, an operator may attempt to remove the wrong component.

Therefore, is desirable to provide a mechanism that reduces the possibility of misuse or abuse by human operators of mechanisms for engaging and disengaging components, and mechanisms for managing the electrical hot swap processes.

SUMMARY OF THE INVENTION

The present invention provides a mechanism that prevents premature disengagement of components the computer system. An indicator shows that a component is ready to be removed and positively identifies which of multiple identical components should be removed. The mechanism is able to block attempted removal of the wrong component or of a component if the electrical processes necessary for hot swap have yet to complete. Thus, for a component that is ready to be removed, an operator expects to apply a relatively light force to remove or insert the component. The light force applied minimizes the chance of mechanical damage to the system. The result is a substantially more reliable system, that is less prone to damage during hot swap operation and less prone to removal of the wrong component.

In one embodiment, the present invention includes a module for a computer system, the system including a chassis having at least one compartment for accepting the module, and processing resources, comprising: a carrier adapted to fit within the compartment in the chassis with a component mounted inside; a connector adapted to mate with a corresponding element in the computer chassis upon engagement of the module; and means, coupled with the carrier, for engaging and disengaging the component with the system. In various embodiments, the means for engaging may leverage an insertion force applied to the carrier to mate the connector with the corresponding elements in the chassis. It may include a pivotal handle arm coupled to the carrier defining a travel guide; a rotatable hub coupled with the carrier having a protrusion which engage the travel guide; a first lever arm, coupled between the hub and a first engagement member, the engagement member positioned near the lateral edge of the carrier to engage the chassis when the handle arm is moved to an inserted position. The movement of the handle arm toward the inserted position rotates the hub and directs the first lever arm to rotate the engagement member to engage the chassis. The first engagement member may include a catch which engages insertion and extraction stop mounted on the chassis.

In a further aspect of the present invention, the first lever arm and first engagement member may be mirrored by a second lever arm coupled to the hub and a second engagement member coupled to the second lever arm. These elements positioned on opposing lateral edges of the carrier may form a structure adapted to apply a substantially balanced force.

Another feature of the present invention includes a lock in communication with the processing resources which prevents disengagement of the carrier absent an enable signal provided by the processing resources.

An alternative embodiment of the present invention is an assembly for engaging a component to a computer system, the assembly comprising: a carrier adapted to retain the component and to be inserted within the chassis of the computer system; a handle arm coupled to the carrier; a detector coupled to the carrier and the handle arm, the detector detecting movement to actuate a lock; and a lock blocking movement of the carrier when engaged. This embodiment may further include logic associated with a computer system and coupled to the lock to selectively override the detector and de-actuate the lock when the component is ready for removal. The detector may provide a signal to actuate the lock and the logic may provide a control signal to selectively de-actuate the lock. In addition, there may be a handle mounted on the handle arm and a trigger mounted on the handle, the trigger having a released position in which it is biased and a depressed position, the trigger applying a force to the detector when the trigger is in its released position. In an embodiment, the detector is coupled to the trigger by a detector surface having a biased distal end that extends to meet the trigger, the biased distal end having a raised position in which it is biased and a depressed position, the biased distal end being coupled to actuate the lock when in its raised position.

An aspect of the invention is that the lock alternatively comprises a cam and a solenoid or it comprises a solenoid secured to the carrier and having a rod, the rod being slidable between an extended position in which it is biased and a retracted position, and a cam secured to the handle arm and movable between a locked position for resisting movement of the handle arm and an extended position, the cam adapted to engage the rod and move into the unlocked position when the rod is in the extended position. The cam may be pivotal in a plane that is substantially parallel to the handle arm. The logic should include resources for receiving a request to remove component and resources for determining whether the component is ready for removal from the computer system. Preferably, the logic is coupled to a graphic user interface. The logic may includes resources for enabling an indicator light proximate to the component being removed to signal when the component is ready for removal.

In another embodiment, the present invention includes an assembly for engaging a component to computer system, comprising: a carrier having a front end and a back end, adapted to retain the component and to be inserted within the chassis coupled with the component and a connector adapted to mate with a corresponding element in the computer chassis; a pivotal handle arm defining a travel guide; a rotatable hub coupled with the carrier and having a protrusion engaging the travel guide; a first lever arm coupled between the hub and a first engagement member, positioned to engage the chassis when the handle arm is moved to the inserted position; a lock coupled to the handle arm to prevent movement of the handle arm when the lock is engaged; and a detector for detecting movement to actuate and engage the lock. There may be logic associated with the computer system and coupled to the lock to selectively override the detector and de-actuate the lock when the component is ready for removal. Alternatively, there may be logic associated with the computer system to provide a control signal the lock to selectively de-actuate a lock when the component is ready for removal.

An aspect of this embodiment may be that movement of the handle arm toward an inserted position rotates the hub, moves the first lever arm, rotates the engagement member and engages the chassis. The first engagement member may include a catch which engages insertion and extraction stop mounted on the chassis.

In a further aspect of the present invention, the first lever arm and first engagement member may be mirrored by a second lever arm coupled to the hub and a second engagement member coupled to the second lever arm. These elements positioned on opposing lateral edges of the carrier may form a structure adapted to apply a substantially balanced force.

As part of the detector, there may be a handle mounted on the handle arm and a trigger mounted on the handle, the trigger having a released position in which it is biased and a depressed position, the trigger applying a force to the detector when the trigger is in its released position. In an embodiment, the detector is coupled to the trigger by a detector surface having a biased distal end that extends to meet the trigger, the biased distal end having a raised position in which it is biased and a depressed position, the biased distal end being coupled to actuate the lock when in its raised position.

Aspects of the lock, logic and indicator light in this embodiment may be as summarized above for other embodiments.

In a further embodiment, this invention includes an assembly for engaging a component to a computer system having a chassis, comprising: a carrier adapted to retain the component and to be inserted within the chassis to couple the component to a connector associated with the computer system; a lock coupled to the carrier to prevent removal of the carrier from the chassis when the lock is engaged; and logic associated with computer system to determine whether the component is ready to be disengaged from computer system, logic being coupled to the lock to selectively engage or disengage a lock when the computer system is operational. This embodiment may further include a detector, aspects of which are set forth above.

Alternatively, the concepts of the present invention may be embodied in a module for a computer system, having a chassis with at least one compartment, and processing resources, comprising: a carrier adapted to fit within the compartment in the chassis; a component mounted in the carrier; a connector adapted to mate with a corresponding element in the; a pivotal handle arm coupled; a translation mechanism to translate movement of the handle arm into force causing disengagement of the module from the chassis; a detector coupled with the handle arm which detects movement; a lock preventing movement of the handle arm past an intermediate position when locked; and logic coupled with processing resources and the detector, which locks the lock upon detection of motion unlocks and which causes the lock to enter the unlocked state upon receipt of a signal from the processing resources.

In aspects of this invention, the translation mechanism includes a hub which rotates upon movement of the handle arm between the intermediate position and the inserted position. Preferably, the lock assumes the unlocked state when not powered.

Aspects of the handle arm, hub and engagement member summarized above may also be found in this embodiment, as may be aspects of the detector, lock, logic and indicator.

The present invention provides mechanical and electrical components which improve the reliability of systems with hot swap capability, and make such operations more easily executed.

Further aspects and advantages of the present invention can be seen upon review of the figures, the detailed description, and the claims which follow.

BRIEF DESCRIPTION OF THE FIGURES

FIG. 9B is a reverse isometric view of a module or assembly, in the same state as FIG. 9a.

FIG. 10A is a right back isometric view of a module or assembly, with the handle rotated 45 degrees from the inserted position and the engagement members clearing the extraction stops.

FIG. 10B is a reverse isometric view of a module or assembly, in the same state as FIG. 10a.

FIG. 12 is a right front isometric view of a module or assembly, with handle moving from the extended position inward, the handle being rotated 15 degrees from the inserted position and the protrusion from the hub following the travel guide in the handle arm.

DETAILED DESCRIPTION

Figure 1:
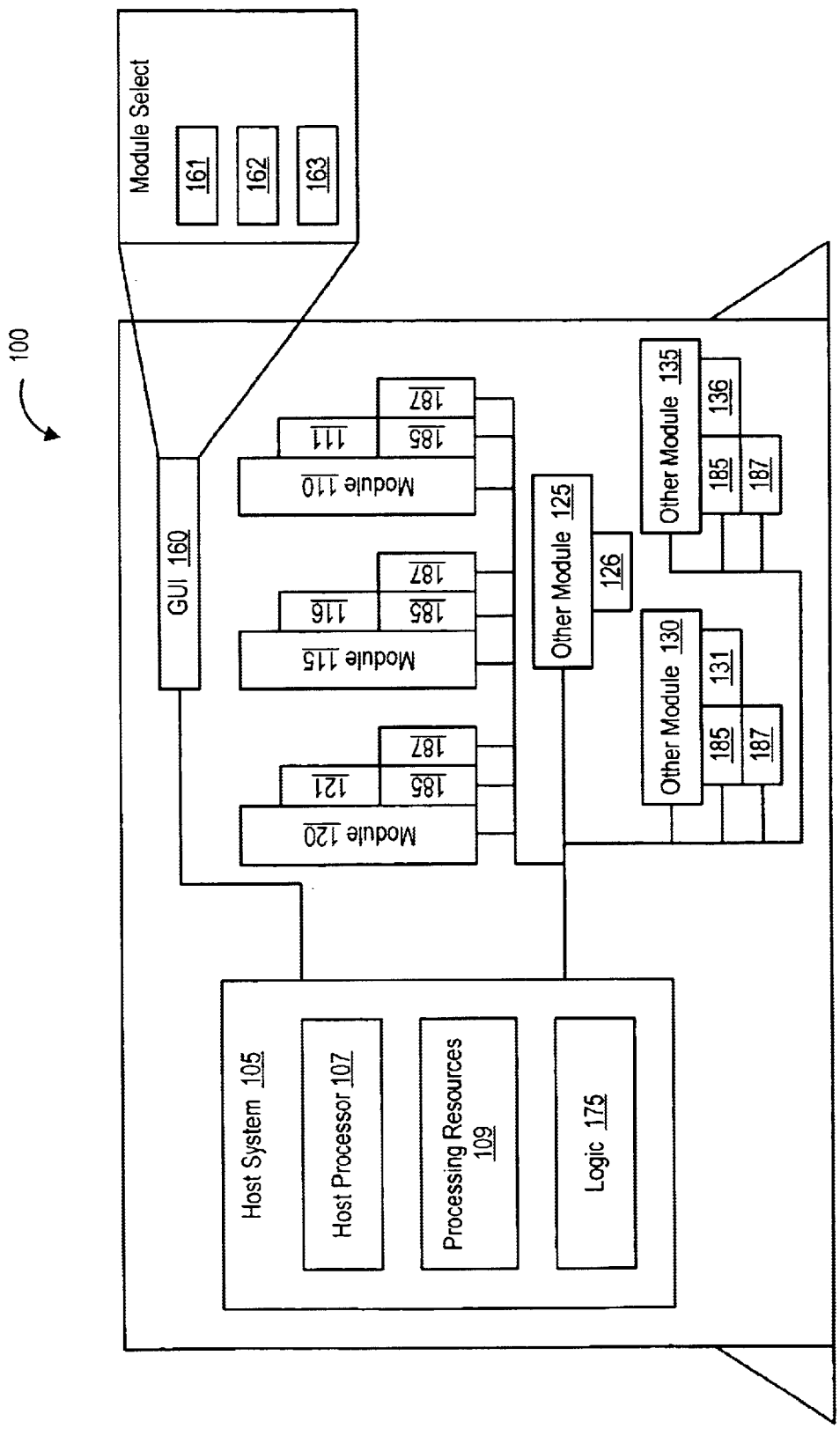
FIG. 1 is a front view of computer system employing the concepts of this invention.

A detailed description of embodiments of the present invention is provided with reference to the figures, in which FIG. 1 shows a computer system chassis 100 having a plurality of modules and a graphic user interface 160 according to the present invention. The computer system chassis 100 has a face 145 through which components are added to and communicate with the host processing system 105 in the chassis 100. The components are engaged to communicate with the host processor 107 in compartments accessible through corresponding slots or openings in the face 145 of the chassis 100. The date processing resources in a preferred provide storage services for a network of computers. In such preferred system, the components include memory modules, such as large arrays of flash EPROMs or disk drives storing large amounts of information. In addition, network interface components are included supporting a network architecture to provide memory services to many users. The host system 105 in the chassis 100 further include processing resources 109 associated with removing and inserting modules during operation of the host.

The components are mounted in carriers that are removably mounted in compartments of the chassis 100 through the slots in the face 145. Such components include controller circuit boards, disk drives, memory circuit boards and other devices having resources for communicating with the host system. In the simplified example shown in FIG. 1, modules 110, 115 and 120 are arranged vertically in the face 145. The modules 110, 115 and 120 each include handles 111, 116, 121, and respective covers as shown in more detail in FIG. 2. The handles 111, 116, 121 are engaged with a mechanism on the respective cover for locking the component within the chassis 100 when the host system is operational.

As represented schematically in FIG. 1, other modules 125, 130, 135 are shown in the face 145. These modules are formed in alternative configurations, such as in a horizontal alignment relative to the chassis 100. Such alternative modules may include disk drive arrays or other types of components designed for operation with the host system. In the example shown the additional modules 125, 130 and 135 include handles 126, 131 and 136 adapted for coupling with a locking mechanism and an assembly for translating motion of the handle into insertion and removal force for the component.

Also shown in FIG. 1 is a graphic user interface GUI 160. The GUI 160 provides an interface for the operator of the device. The interface is monitored by control processes in the host system 105 for managing hot swap operations. Thus, the GUI includes a module select window having graphical buttons 161, 162 and 163 by which users are able to select modules and functions related to such modules for execution by the processes in the host system. Thus logic 175 within the host system 105 is coupled to the interface for managing the preparation of communication systems and power management resources for removal and insertion of components. In one embodiment, the GUI 160 also acts to signal the operator when the component is ready for removal, and the host system 105 is no longer overriding the lock mechanism on the component.

The modules, such as module 110 of the system include a component mounted within a carrier. The carrier includes a structure for securing a connector for connection of the component to the system communication structure, and a mechanism for engaging and disengaging the module with the system chassis. Also. a mechanical lock 185 is included with the carrier which is engaged to prevent removal of the module unless the system has released the lock 185. Also, each lock 185 is coupled with a respective detector 187.

Figure 2:
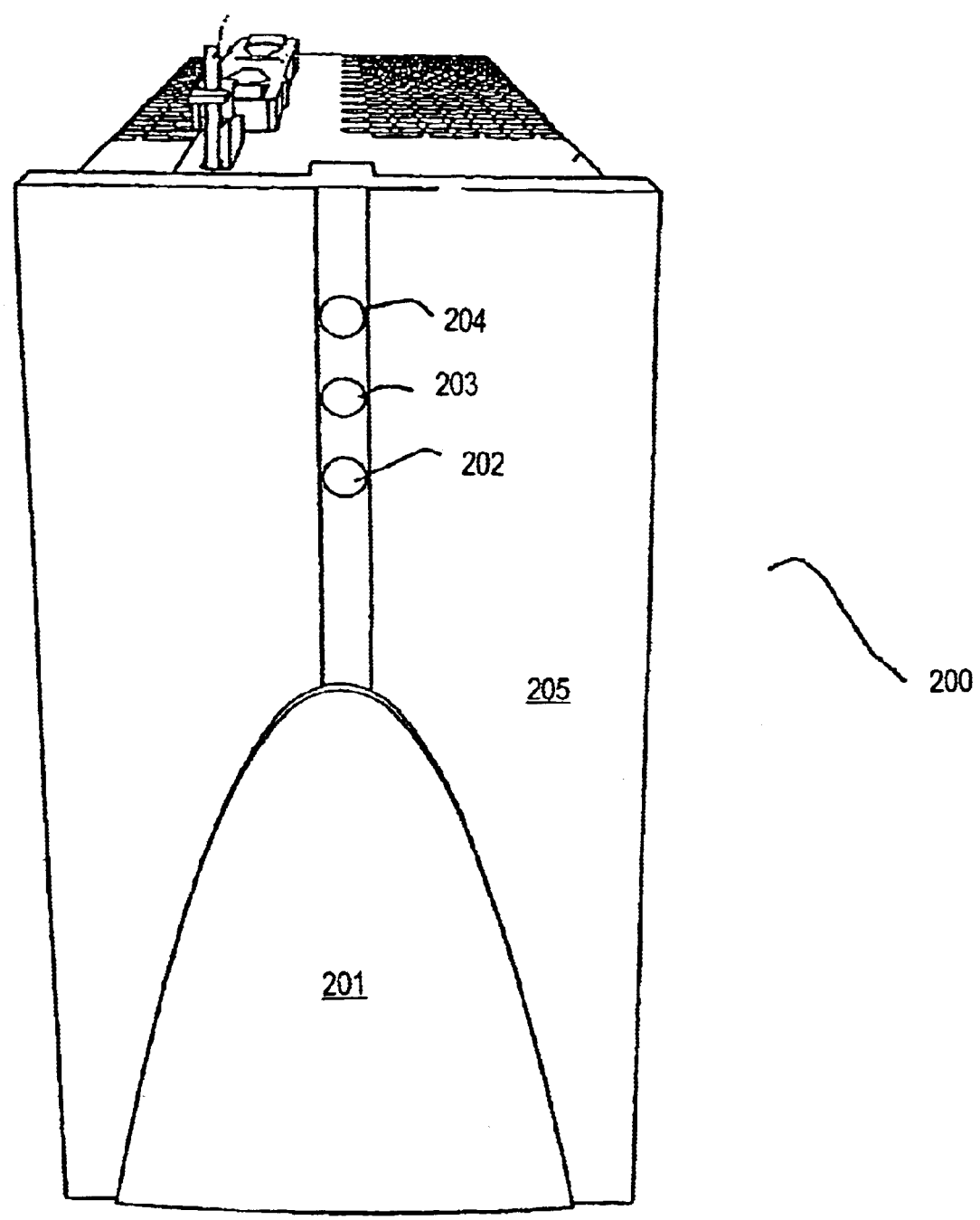
FIG. 2 is a face-on isometric view of a module or assembly.

FIG. 2 is a front isometric view of an embodiment of the present invention. The module or assembly is labeled 200. A movable handle 201 operates the engagement and disengagement mechanism of the module. Cover 205 is on the front end of the module carrier, as depicted in subsequent figures. Three indicator lights 202, 203 and 204 are proximate to the module. In this embodiment, they are mounted directly on the cover of the module. In other embodiments, some or all of the indicator lights could be mounted on the chassis near the module. One or more of these indicator lights are coupled to logic associated with the computer system (not shown) which controls a lock and the indicator light. This logic is able to provide an enable control signal selectively to de-actuate the lock and also a signal to enable the indicator light indicating that the module is ready to be removed.

Figure 3:
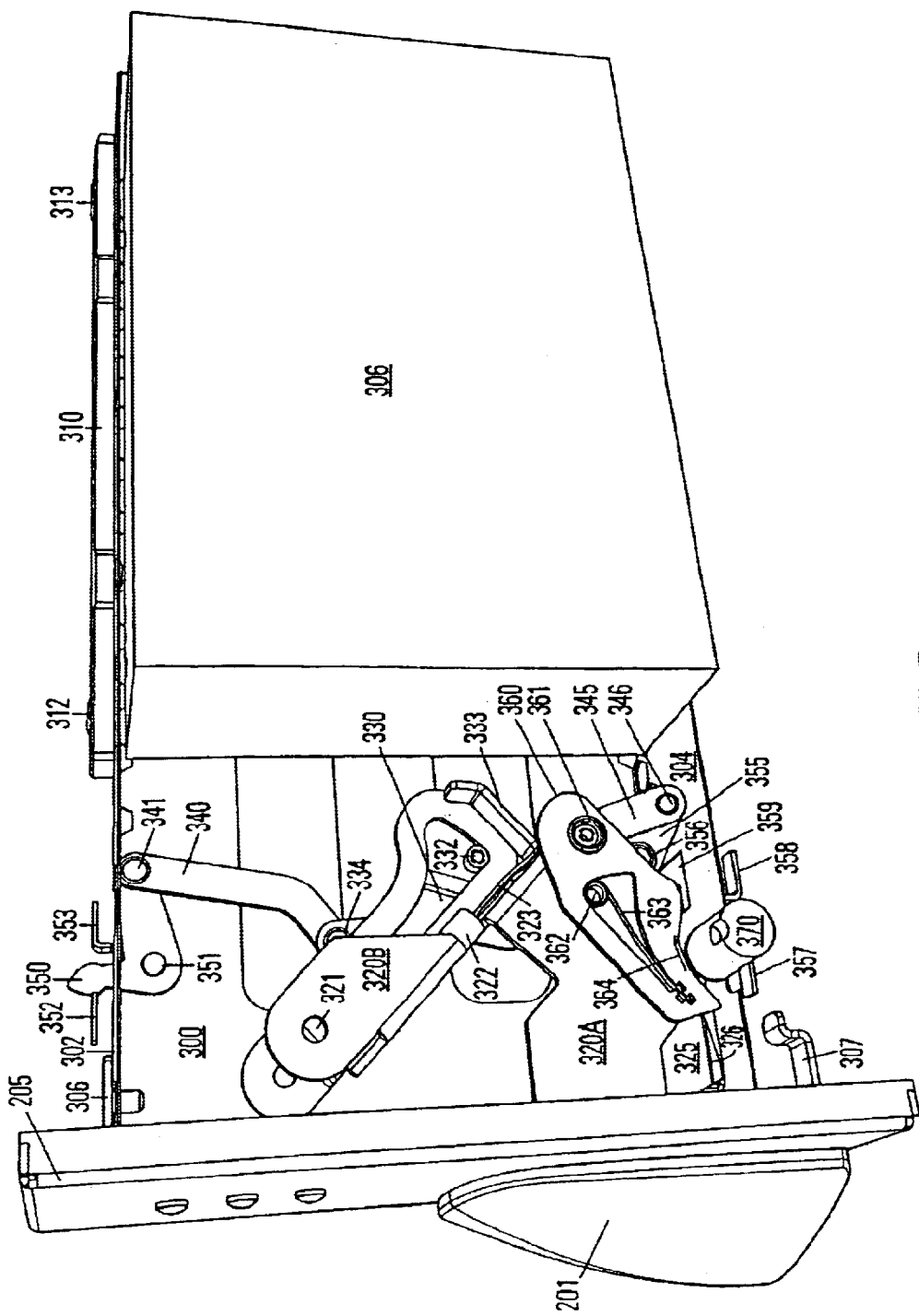
FIG. 3 is a right front isometric view of a module or assembly, with the handle in the inserted position with respect to the carrier.

FIG. 3 depicts a module for a computer system, also referred to as an assembly for engaging a component to a computer system. This module is adapted to fit within a compartment or slot in the chassis of a computer system. The carrier 300 for the module or assembly has a lateral edge 302, an opposing lateral edge 304, a front end at the cover 205 and a back end opposite the front end. The carrier 300 has an inside where the component 306 is mounted, and an outside. To aid in insertion of the carrier into the chassis, a top guide 310 with leaf springs 312 and 313 are provided, which electronically ground the module. The guide and springs fit into a slot in the chassis. As will be seen in later figures, the top guide and springs are matched by a bottom guide and springs in this embodiment. The cover 205 is secured to the carrier by clips 306 and 307. Collectively, a handle arm 320A and 320B, a hub 330, a first lever arm 340 and a first engagement member 350 provide means, coupled with the carrier, for an engaging and disengaging the carrier and its component with the computer system. The connections among these elements are described below.

A handle arm 320A and 320B is pivotally secured to the carrier at 321. As will be seen in later figures, the handle arm in this embodiment includes two flat surfaces substantially parallel to each other with a bend between the surfaces so that the two surfaces are offset. One extent of the handle arm 320A extends through a slot in cover 205. The handle arm has a handle 201 attached outside the front cover. The handle arm moves from an inserted position through an intermediate position to an extended position in an arc of approximately 45 degrees. FIG. 3 illustrates the handle in its inserted position. The prongs of handle 320B may straddle handle arm 320A and are rotatably coupled to the carrier 300. The handle arm 320B defines a travel guide, which is a cut-out in the shape of right triangle with a concave hypotenuse and rounded corners. This travel guide engages a protrusion 332 on the hub 330 which is rotatably attached to the carrier at 331. A tubular rivet may be used at 331. Various approaches can be taken to prevent protrusion 332 from escaping the travel guide. Finger 333 of hub 330 can serve as a keeper. A washer can be mounted on protrusion 332 so that the travel guide of arm 320B is between hub 330 and the washer. In some embodiments, one or more support bearing surfaces behind hub 330 and in front of arm 320B can be used to assure that those components remain in the desired plane of rotation. In FIG. 3, the hub rotates clockwise as the handle arm moves from its inserted to its extended position. When the handle arm is in its inserted position, as depicted in FIG. 3, the hub is somewhat over rotated counter-clockwise so that force applied to the hub to disengage the component tends to over-rotate the hub counter-clockwise, rather than rotating it clockwise toward disengagement.

The hub 330 is pivotally attached at 334 to a first lever arm 340. It is also pivotally attached to a second lever arm 345 at a point not visible in this figure. The first and second lever arms may pass through slots in the lateral edge 302 of the carrier and the opposing lateral edge 304 of the carrier. In FIG. 3, slot 359 in the opposing lateral edge 304 can be seen. The first lever arm 340 is pivotally attached at 341 to a first engagement member 350. The first engagement member is pivotally attached to the carrier at fulcrum 351, which leverages the force applied to the handle to engage the component and mate respective connectors on the component and the chassis. In some embodiments, a coplaner bearing surface may be provided adjacent to the first and second lever arms or the first and second engagement members to assure that their movement remains in the intended plane, without twisting or torquing. Movement of the handle arm toward the inserted position rotates the hub and directs the lever arm to rotate the engagement members to engage the chassis. The first engagement member is positioned with respect to the lateral edge 302 of the carrier so that it engages the chassis of the computer system when the handle arm is moved to its inserted position. In this embodiment, the first engagement member includes a catch which engages an insertion stop 353 and an extraction stop 352. As can be seen in other figures, the second engagement member 355 also has a catch which engages a second insertion stop 358 and a second extraction stop 357. FIG. 3 shows that the second engagement member 355 is positioned with respect to the opposing lateral edge 304 of the carrier so it engages the chassis when the handle arm is moved to the inserted position. FIG. 3 also shows that the second engagement member rotates through a slot 359 in opposing lateral edge 304 to engage the chassis. In one embodiment of the present invention, the first and second engagement members are positioned on opposing lateral edges of the carrier so as to apply a substantially balanced force to the first and second engagement members and, thus, to the respective positions of the chains or stops on the chains which they engage.

This embodiment also includes a lock, comprising a cam 360, a protrusion 362, a spring 363, surface on the cam 364, a solenoid 370, a rod (not shown) in the solenoid, and a stop (not shown). This lock is coupled with a detector 187 to detect movement and actuate the lock and to logic associated with the computer system to selectively override the detector and de-actuate the lock when the component is ready for removal. The detector may provide a signal to actuate the lock and the logic may provide a control signal to selectively de-actuate the lock. The lock is coupled with the means for engaging and disengaging and is in communication with processing resources which prevent the disengagement of the carrier absent an enabled or control signal from the processing resources. When the lock is in its locked position, the cam 360 engages the chassis or a stop on the chassis for resisting movement of the handle arm and removal of the component. When the lock is in its unlocked position, the cam 360 clears the chassis and stop, permitting the handle arm to move to its extended position and permitting the component to disengage from the system. In this embodiment, the elements of the lock are assembled as follows: the cam 360 is pivotally coupled to the handle arm 320A at 361. A tubular rivet may serve as a pivot axis. A protrusion 362 from the handle arm 320A engages an arc guide defined in the cam 360. The arc guide in this embodiment describes an arc through which cam 360 pivots. Spring 363 mounted on the cam 360 engages the protrusion 362 to bias the cam towards its locked position. One skilled in the art will, of course, recognize that there are many other ways to bias the cam. The surface 364 of the cam is adapted to engage with a rod (not shown) of the solenoid 370. When the solenoid rod is in its normal extended position, the cam surface 364 rides over the road and will clear a stop (not shown). With the movement of the handle arm 320A, the cam 360 engages the rod and assumes its unlocked position. If the solenoid 370 is actuated and the rod is in its retracted position, instead of its extended position, the cam 360 will be biased to assume its locked position and to engage with the chassis or a stop on the chassis. The solenoid 370 is coupled to the carrier, as is the stop which cannot be seen in this figure.

To prevent accidental rotation of handle arm 320, one embodiment provides a trigger including a finger bearing surface (not shown) accessible by reaching under and behind handle 201 and actuated by pressing upward. Pressing the trigger rotates trigger arm 325 which includes tab 326. Trigger arm 325 is biased by leaf spring 323 which is mechanically coupled to the trigger arm and captured by keeper 322. Tab 326 engages the plunger of a two pole switch (not shown) which actuates the solenoid 370. This switch detects movement of the handle arm. It also powers on the solenoid, which allows the solenoid to remain unpowered when the arm is in its inserted position. As the unpowered solenoid is biased in an unlocked position, the lock will not be engaged when the system is unplugged or unpowered.

Figure 4:
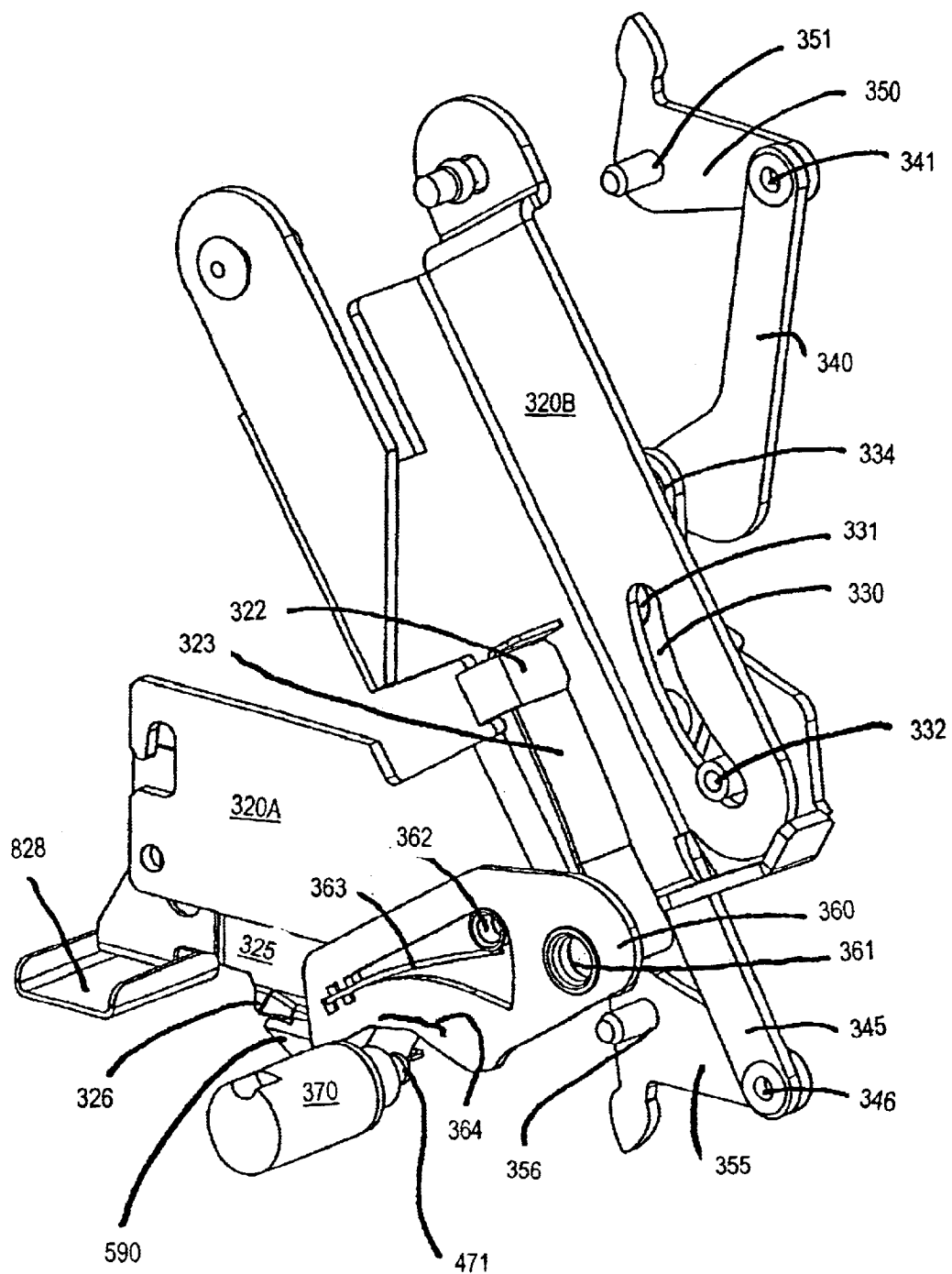
FIG. 4 is an isometric view of the handle arm, hub, first and second lever arms, first and second engagement members, the cam and solenoid, without the carrier.

FIG. 4 is a close-up isometric view of elements of this embodiment which translate movement of the handle arm 320A into engagement of the catches on 350 and 355 with the chassis or stops on the chassis. In FIG. 4, the handle arm is in its inserted position. The engagement members 350 and 355 are in position to engage the chassis or stops on the chassis. The numbering of this figure corresponds to FIG. 3. However, some of the pivotal connection points are depicted as voids in members, rather than fulcrums, pivots, protrusions or other elements for pivotal connection the travel guide defined in the handle arm 320B appears in an alternative configuration which is better adapted to use of a washer mounted on protrusion 322. Visible in FIG. 4, but not in the previous figures, is the rod 471 of the solenoid 370. The engagement of surface 364 of the cam with the rod 471 of the solenoid can readily be seen. Also visible are two pole switch 590 and finger bearing surface 828.

Figure 5:
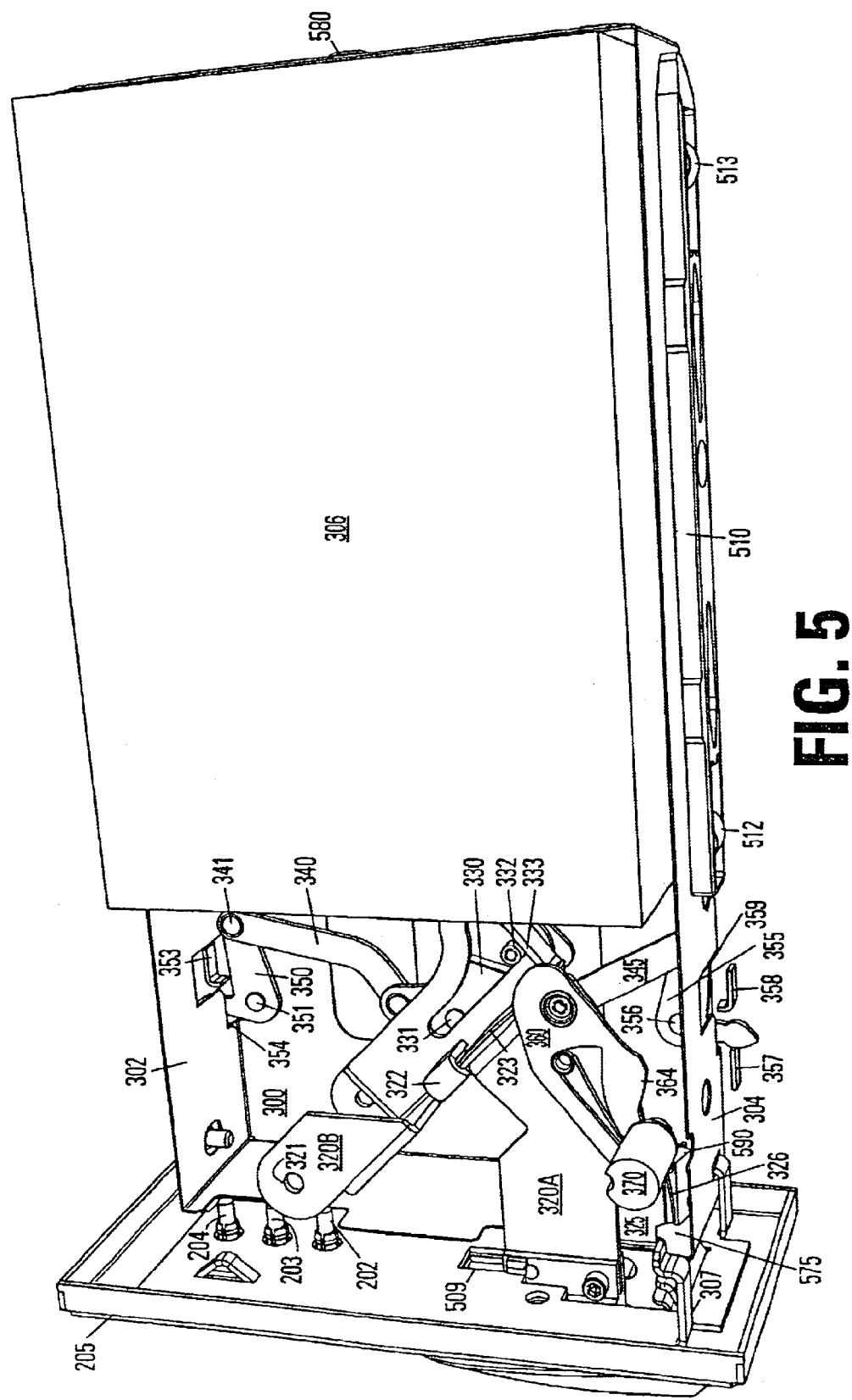
FIG. 5 is a lower right back isometric view of a module or assembly, with the handle in the inserted position.

FIG. 5 is a lower right back isometric view of the module or assembly, again with the handle arm in its inserted position. The numbering of this figure corresponds to the numbering of previous figures. This figure illustrates the mounting of indicator lights 202, 203 and 204 through the cover 205 of the chassis. The attachment of the cover with clips 306 and 307 to the chassis is clear. A few additional features not previously visible are also apparent. At the front end of the carrier, slot 509 through the cover 205 is visible. The handle arm 320A passes through the slot 509. Along the opposing lateral edge 304, the bottom guide 510 and leaf springs 512 and 513 are visible. On the outside of the carrier, at the back end, a connector 580 appears. This connector is coupled to component 306. This connector includes at least one connection element adapted to mate with a corresponding element associated with the computer system (not shown), optically mounted on the chassis upon engagement of the module. The connector 580 may be mounted on the outside of the carrier or on the component. It is coupled with the component to provide an electrical connection between the component and the computer system. At the front end of the carrier, along the bottom, opposing lateral edge, there is a top 575 which engages cam 360 when the cam is in its locked position to resist removal of the component. The location of switch 590, which engages tab 326 of trigger arm 325 is apparent. This switch may include a plunder biased in a first position which engages the tab 326 and is movable to a second position by the tab. This plunger has a detector surface which detects engagement with tab 326.

Figure 6:
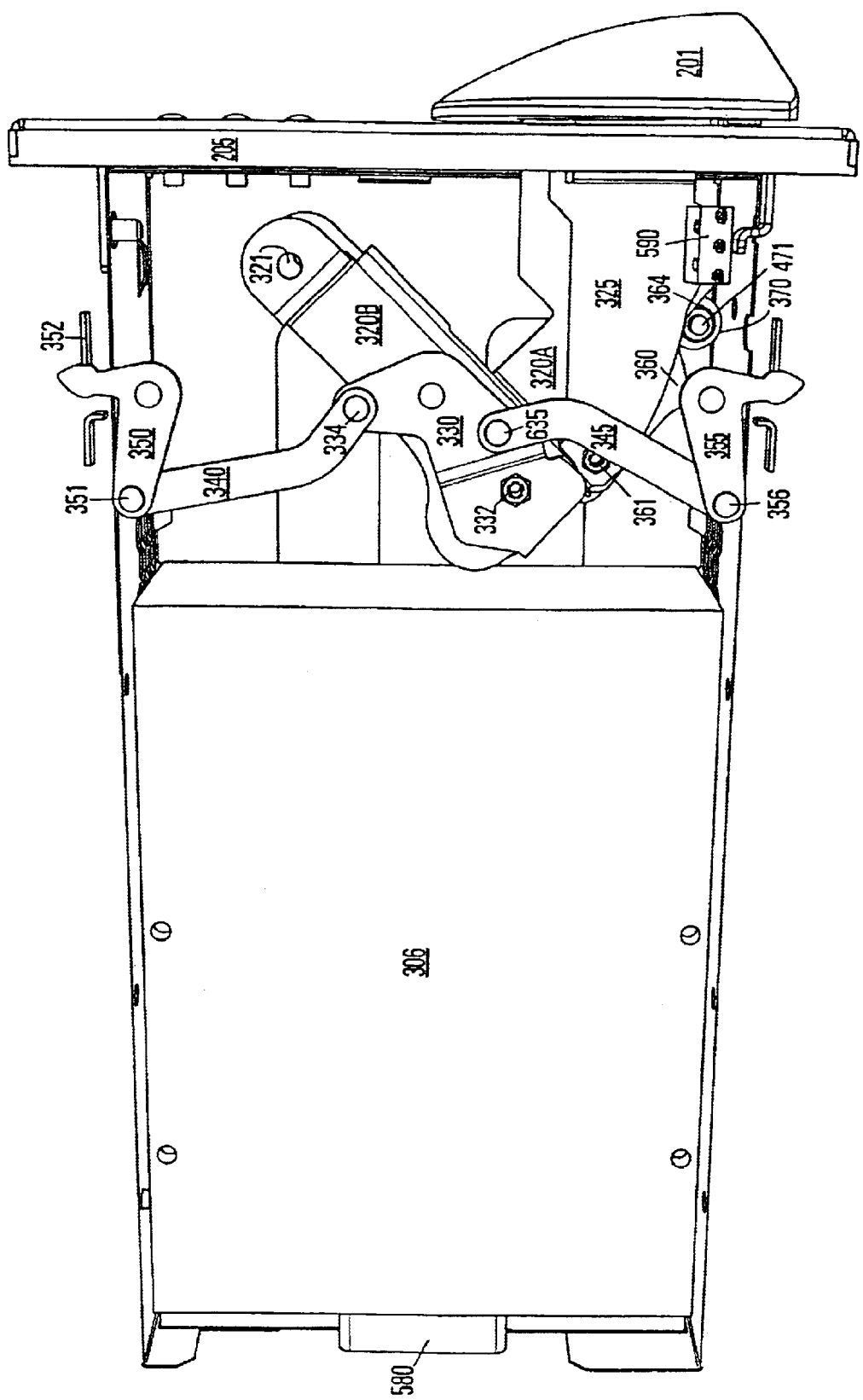
FIG. 6 is a reverse isometric view of a module or assembly, with a face of the carrier removed to reveal the component mounted inside the carrier.

FIG. 6 is a reverse isometric view of the module, with the face of the carrier 300 cut away to reveal the elements mounted inside the carrier. In this view, connector 580 and its coupling to component 306 is clear. The profile of hub 330 is revealed in this figure. The pivotal connection between the hub 330 and second lever arm 345 at 635 is also revealed. The engagement of surface 364 of the cam 360 with the rod 471 can be seen. The over-rotation of the hub when the handle arm 320A and 320B is in its inserted position can be seen, by visualizing an axis between pivotal couplings 351 and 334, as compared to an axis between 351 and the pivotal coupling of the hub at 331. The same is true for an axis between pivotal connections 356 and 635, as compared to an axis between 356 and the pivotal coupling of the hub at 331. This over-rotation is advantageous because removal force supplied to the carrier will not tend to disengage the engagement members. Applying removal force to the carrier would press the catch of the engagement member 350 against extraction stop 352, causing rotation. Through pivotal connection 351, the first lever arm 340 would tend to rotate the hub in the opposite direction as would be required to move the first lever arm toward its disengaged position. The form of trigger arm 325 is better revealed in this figure and its pivot point 361 is apparent. The form of switch 590 and its position adjacent to the trigger arm can be seen.

Figure 7A:
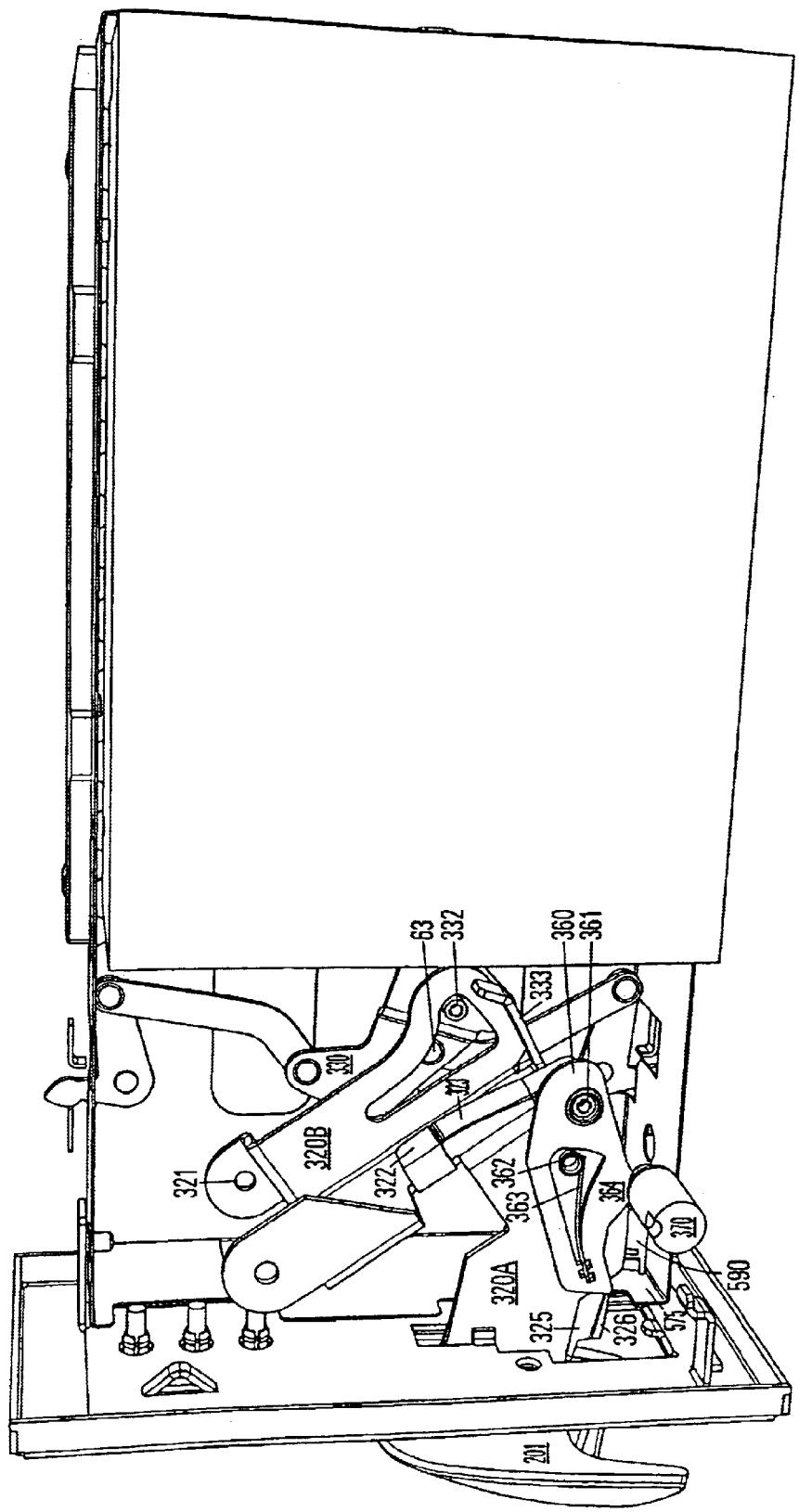
FIG. 7A is a right back isometric view of a module or assembly, with the handle moving outward rotated less than 15 degrees from the inserted position and a surface of the cam riding on the solenoid rod, to clear the lock stop.
Figure 7B:
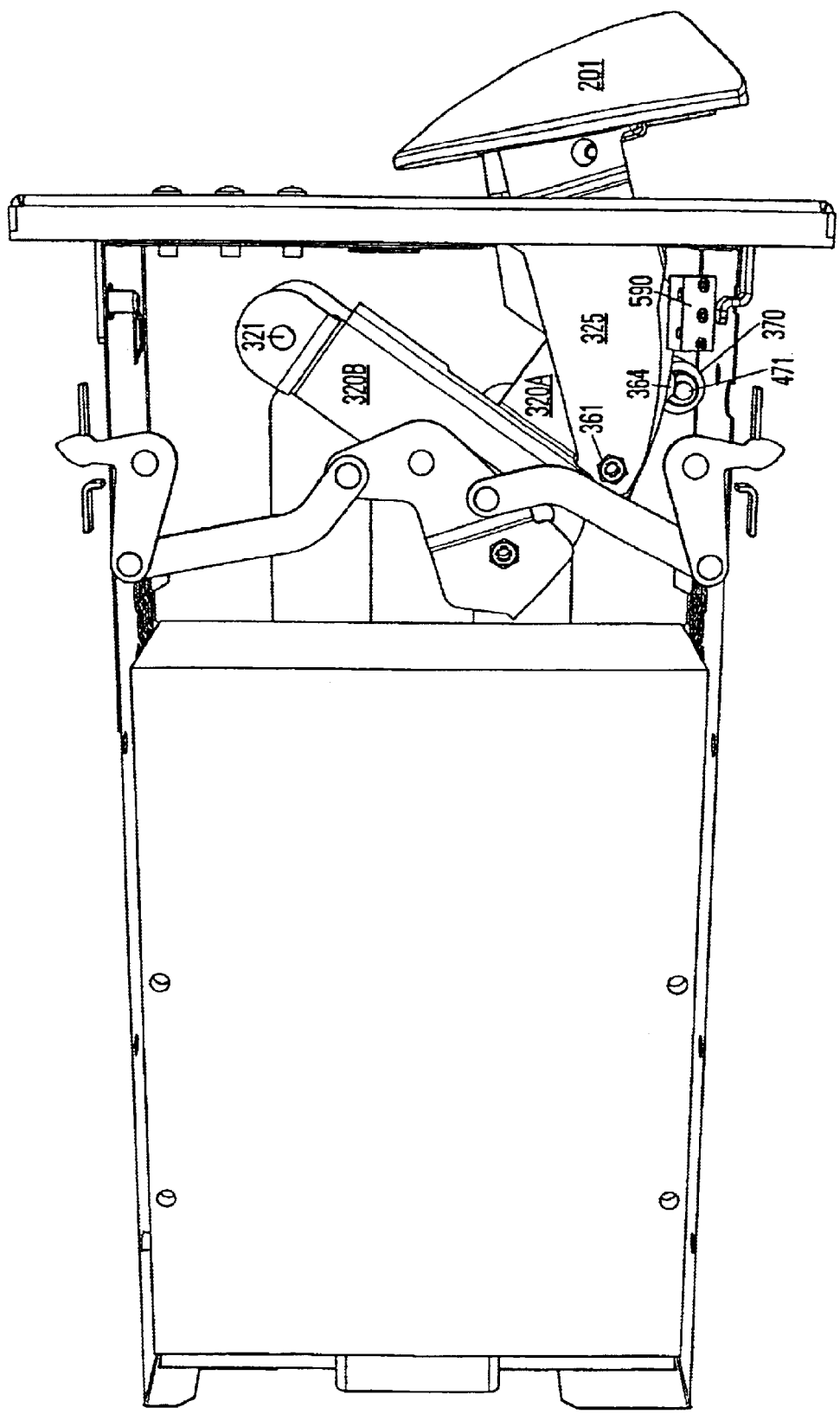
FIG. 7B is a reverse isometric view of a module or assembly, in the same state as FIG. 7A.
Figure 7C:
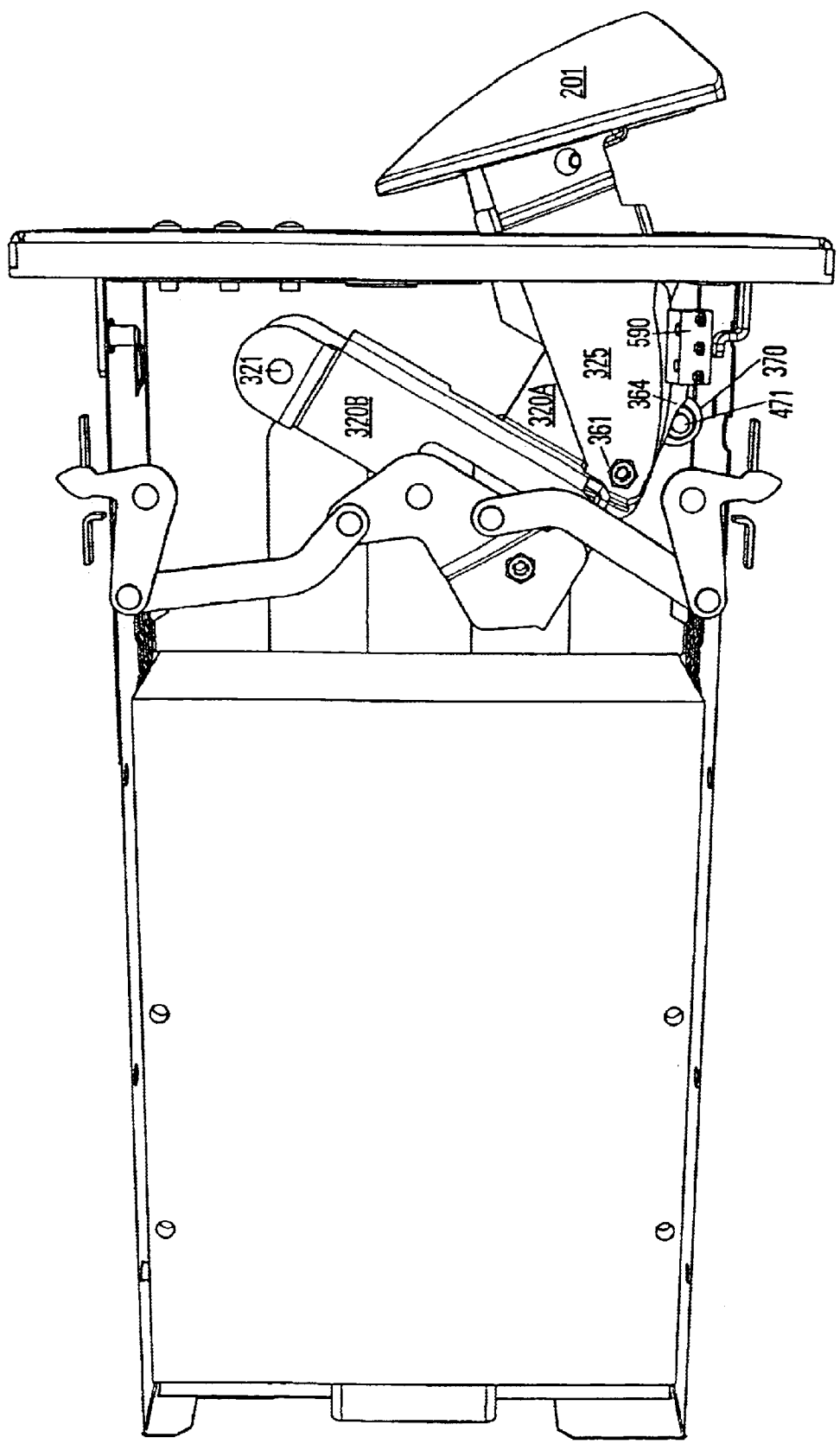
FIG. 7C is a reverse isometric view of a module or assembly, with the handle rotated 15 degrees from the inserted position and a surface of the cam riding on the solenoid rod, having cleared the lock stop.
Figure 7D:
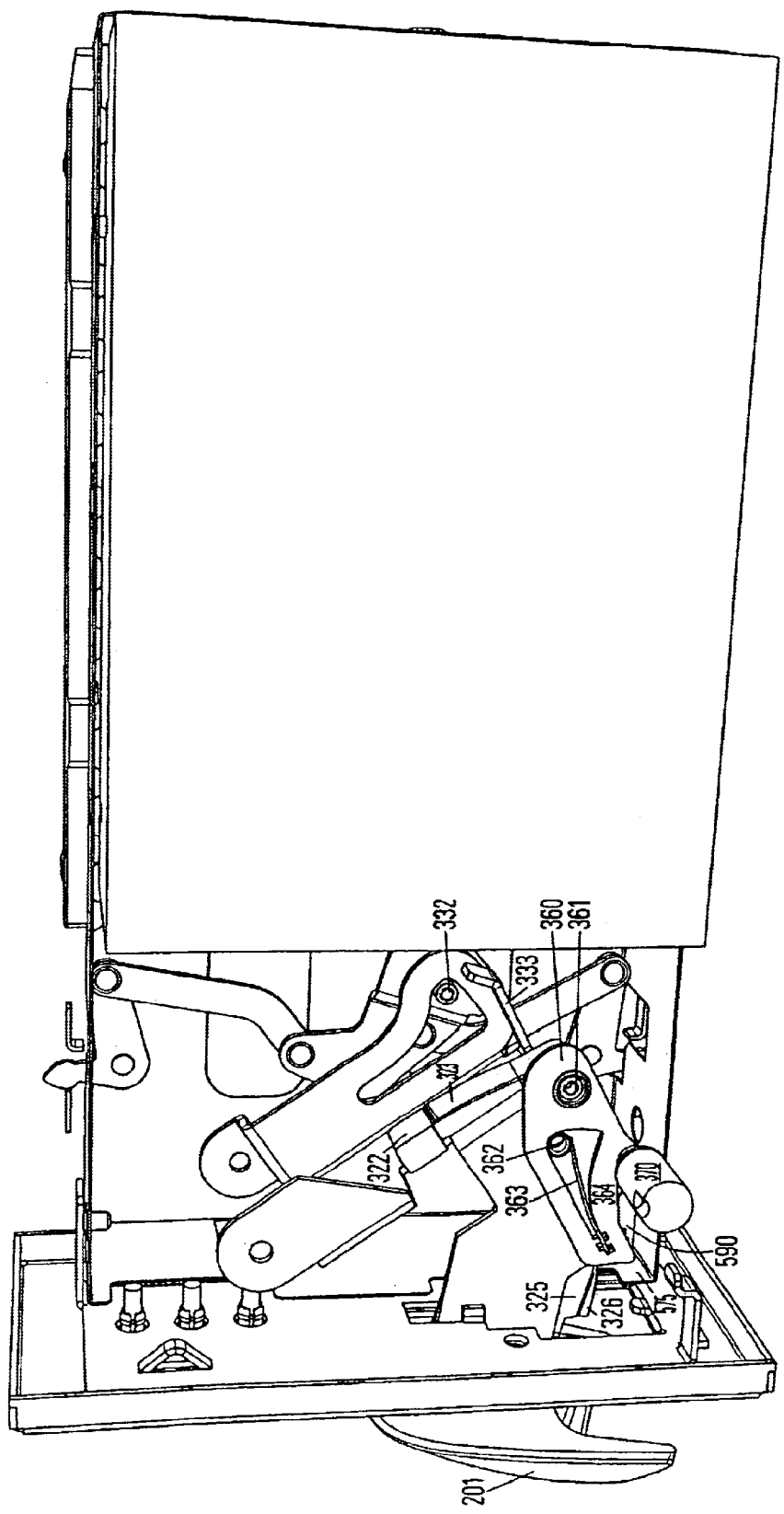
FIG. 7D is a right back isometric view of a module or assembly, with the handle rotated less than 15 degrees from the inserted position and the cam engaged with the lock stop, in its locked position.

FIGS. 7A, 7B, 7C and 7D illustrate the interaction of the cam 360 and the solenoid 370 as the handle arm 320a moves from its inserted to its extracted position. The numbering in these figures is as in the previous figures. In FIG. 7A, the handle 201 and the handle arm 320A have been pulled out less than 15 degrees from their inserted position to an intermediate position. It is apparent that the rod 471 (not shown) of the solenoid 370 is in its normal extended position, as the cam 360 is rotated in opposition to the biasing spring 363 and is in the unlocked position where it will clear stop 575. The cam is rotated because surface 364 is riding on the rod. FIG. 7B is a reverse isometric view with handle 201 in the same position as in FIG. 7A. The contact between surface 364 and rod 471 is shown. FIG. 7C illustrates handle 201 and handle arm 320A rotated 15 degrees from their inserted position to an intermediate position. The contact between surface 364 and rod 471 is again apparent. In FIGS. 7A, 7B and 7C, the cam 360 is in an unlocked position. FIG. 7D shows the cam in its locked position. Rod 471, not visible in FIG. 7D, must be retracted, as cam 360 is securely engaged against stop 575.

Figure 8:
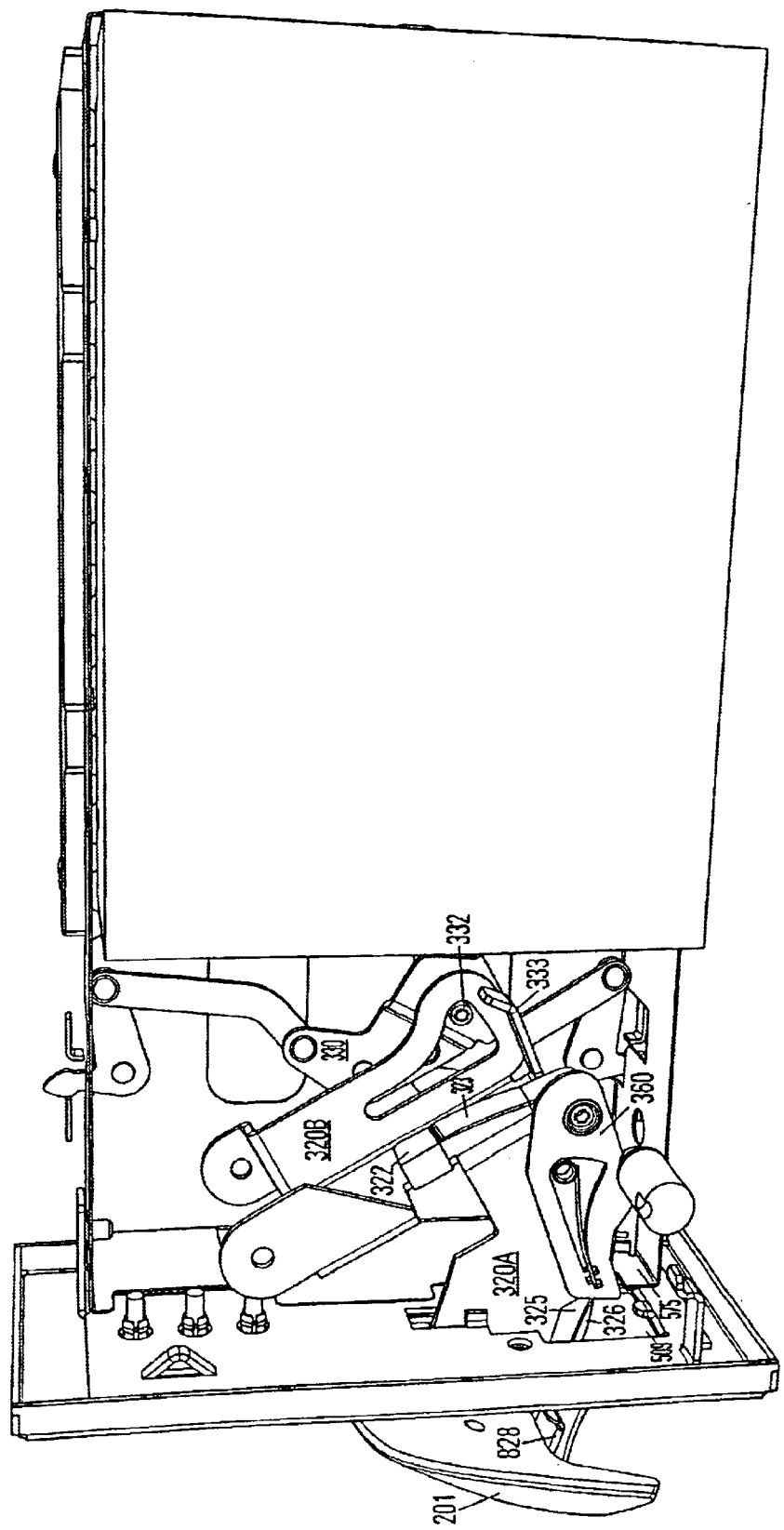
FIG. 8 is a right back isometric view of a module or assembly, with the handle rotated 15 degrees from the inserted position and a surface of the cam riding on the solenoid rod, having cleared the lock stop.

FIG. 8 illustrates the handle 201 and handle arm 320A and 320B rotated 15 degrees from the inserted position. This 15 degree rotation is approximately the extent of free travel of the handle arm before the travel guide engages protrusions 332 and begins to rotate hub 330. This figure shows that the lever arm and hub are still in their over-rotated position. The protrusion 332 has begun to engage the travel guide defined by handle arm 320B. Additional rotation will cause the travel guide to apply force to the protrusion, thereby tending to rotate the hub clockwise toward a disengage position. Finger bearing surface 828, coupled to trigger arm 325, is revealed in this figure and is easily seen in FIG. 9A.

Figure 9A:
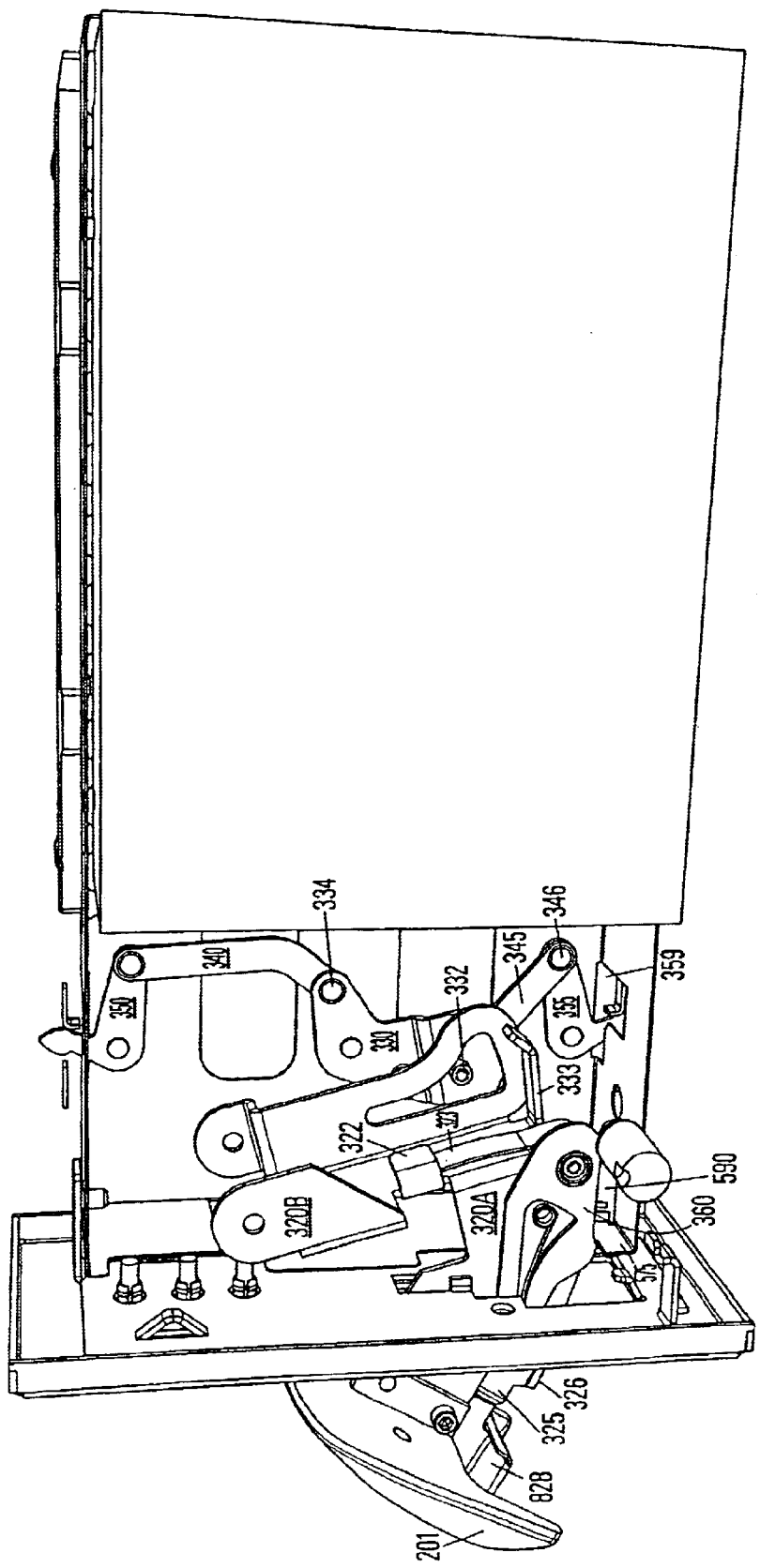
FIG. 9A is a right back isometric view of a module or assembly, with the handle rotated 30 degrees from the inserted position and the cam beginning to extend through a slot in the cover.
Figure 9B:
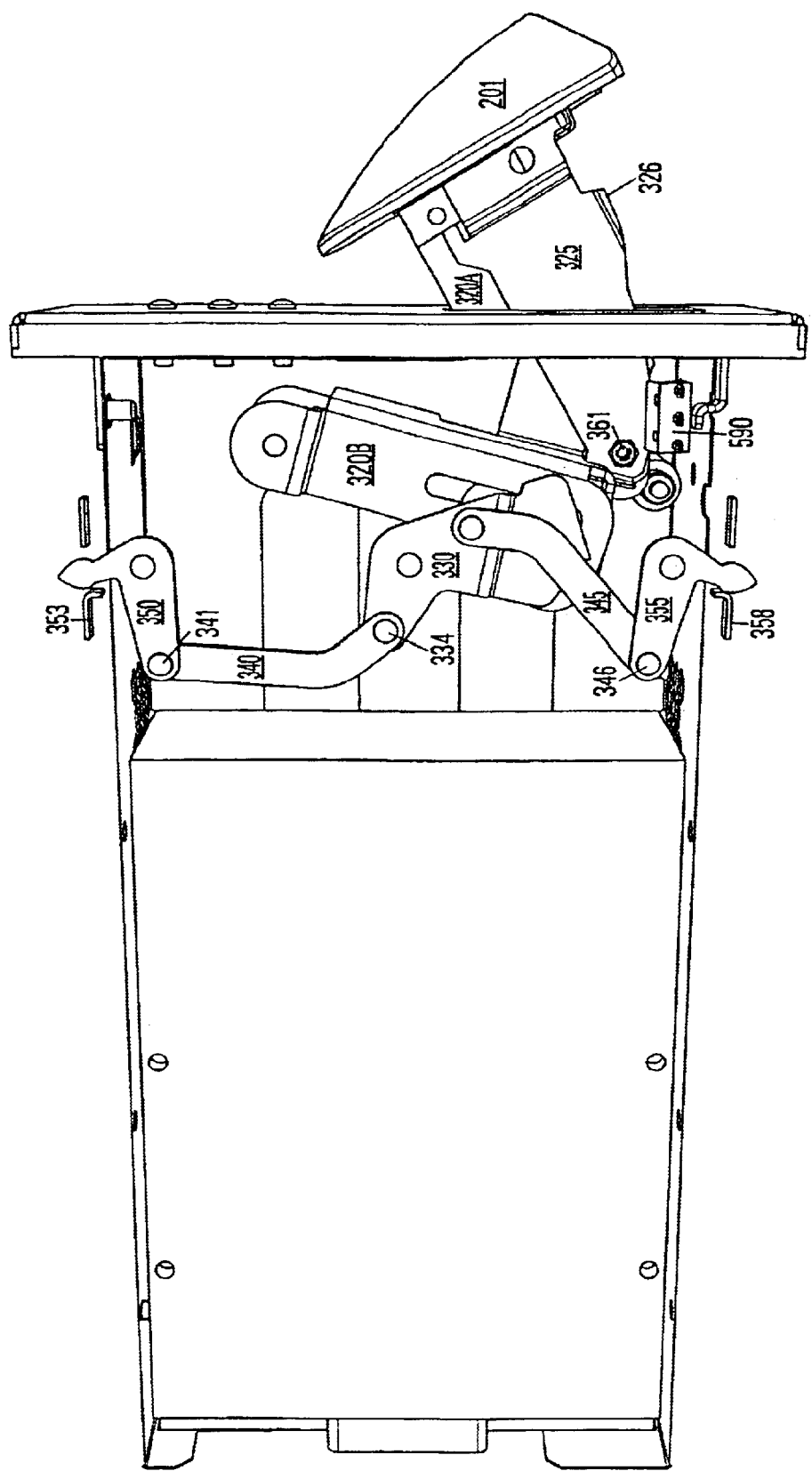

FIGS. 9A and 9B are isometric and reverse isometric views of this translation mechanism, with the handle 201 and handle arm 320A rotated 30 degrees from the inserted position. These figures demonstrate that force applied by the travel guide defined in handle arm 320B to the protrusion 332 translates movement of the handle arm into rotation of the hub, which causes movement of the lever arms and rotation of the engagement members. Movement of the handle arm from the intermediate position to the extended position causes force to be applied by the catches of the first engagement arm 350 and the second engagement arm 355 to the chassis or to insertion stops 353 and 358, promoting disengagement of the module from chassis.

Figure 10B:
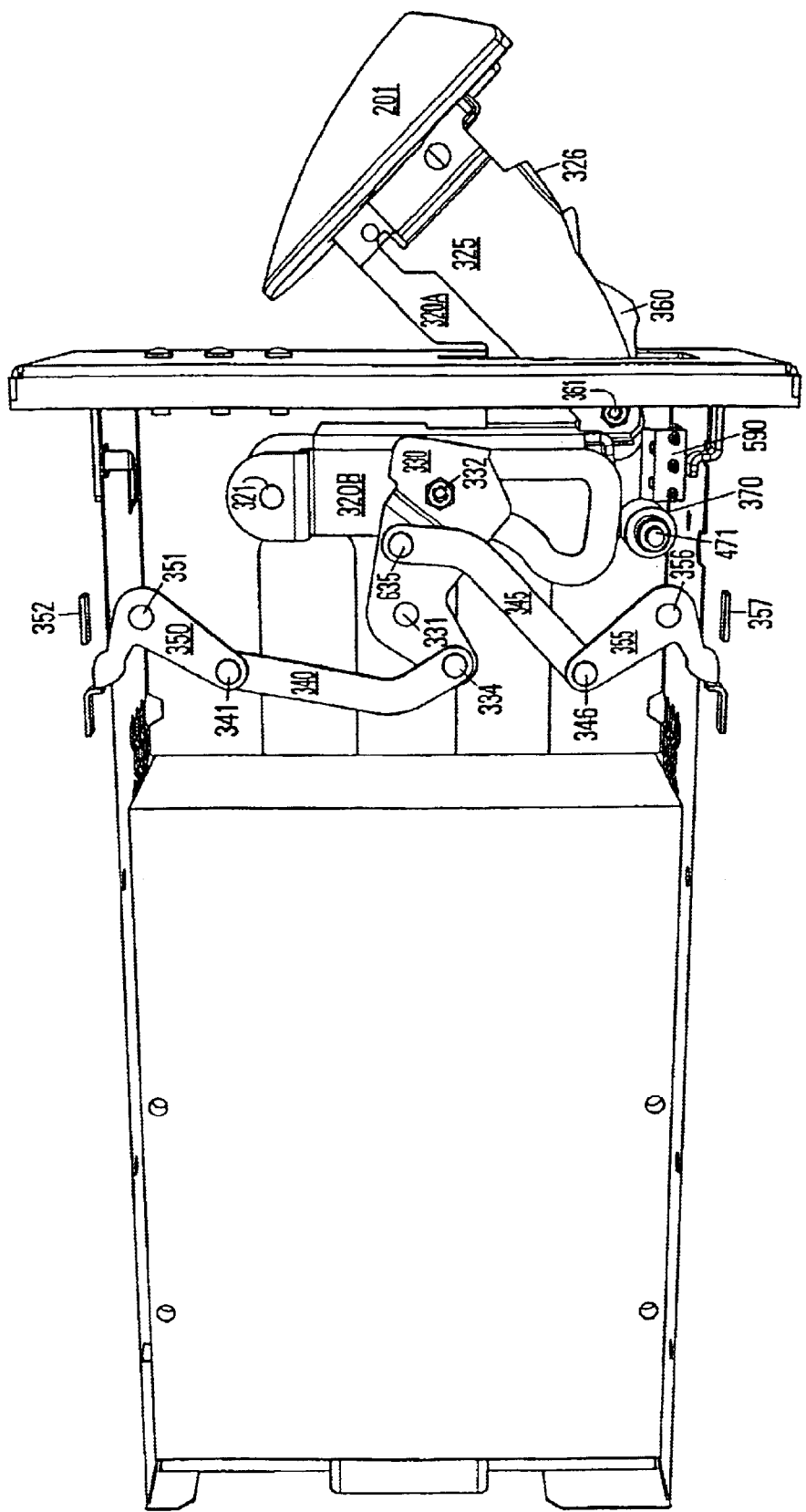

FIGS. 10A and 10B are isometric and reverse isometric views of this translation mechanism with the handle 201 and handle arm 320a rotated 45 degrees to the extended position.

These figures again show how movement of the handle arm from the intermediate position to the extended position translates into force causing disengagement of the module from chassis. In these figures, the catches of the disengagement members 350 and 355 have rotated so that there is clearance between the catches and the extraction stops 352 and 357. A dentate (not shown) in the handle arm or the trigger arm may be supplied to support the handle in its fully extended position.

Figure 11:
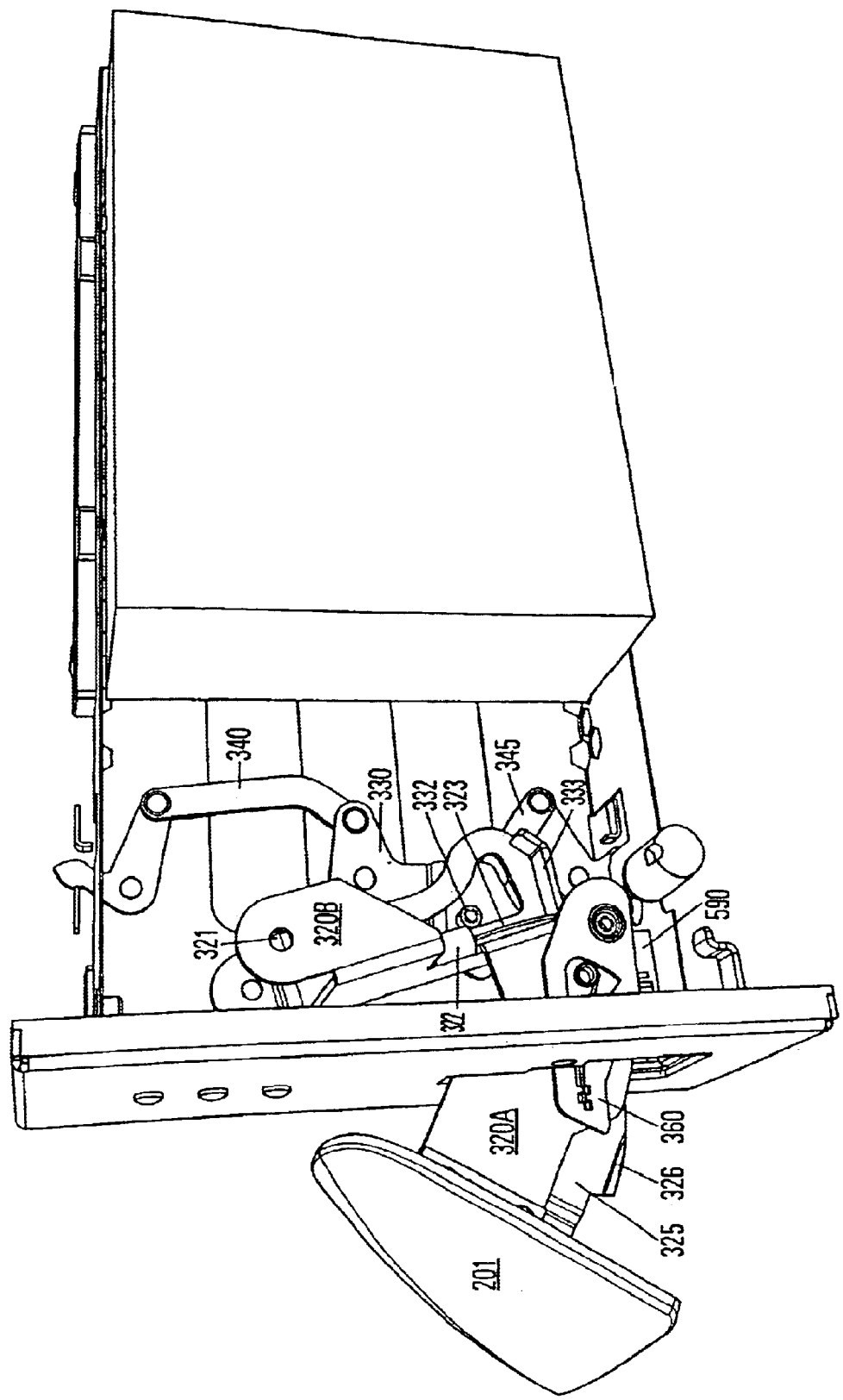
FIG. 11 is a right front isometric view of a module or assembly, with the handle moving from the extended position inward, the handle being rotated 30 degrees from the inserted position and the protrusion from the hub following the travel guide in the handle arm.

FIG. 11 depicts this embodiment of the translation mechanism when the handle 201 and handle arm 320A are being pushed from their extended position to an intermediate position. Due to the shape of the travel guide defined in handle arm 320B, this embodiment of the present invention reacts differently when the handle arm is at 30 degrees on a path toward its inserted position than it does when the handle arm is at 30 degrees on a path toward its extended position. As the handle is pushed in, at 30 degrees the protrusion 332 engages the side of the travel guide proximal to the front end of the carrier. The travel guide applies force to the hub, causing it to rotate the toward its engaged position.

FIG. 12 shows the translation mechanism as the handle 201 and handle arm 320A reach an angle of 15 degrees, on a path from an intermediate position toward the inserted position. The hub is approaching its over-rotated, inserted and engaged position. The protrusion 332 has nearly reached the end of its travel along the edge of the travel guide proximal to the front end of the carrier.

The embodiments shown are advantageous for reasons including: The solenoid is powered from the chassis through a connection to the module. Non-operating (de-energized) boards may be removed at any time. A switch on the release latch alerts the system when a board is being unplugged. The second pole of the switch controls power to solenoid, avoiding the delay otherwise resulting from software control. To save power and reduce heat the solenoid only operates when the release latch is squeezed. No force is applied to the solenoid when the module is locked and a user attempts to remove the module. Only a small force is applied to the solenoid when the system is unlocked. This allows the use of a very small solenoid. The indicator light directs the user to the module being removed. The graphical user interface assists the user in requesting removal of a component. The amount of resistance to removal gives the user a tactile indication of whether the component is ready for removal.

The foregoing description of various embodiments of the invention have been presented for purposes of illustration and description. The description is not intended to limit the invention to the precise forms disclosed. Many modifications and equivalent arrangements will be apparent to people skilled in the art.

What is claimed is:

1. A module for a computer system, the system including a chassis having at least one compartment for accepting the module, and processing resoures associated with removing and inserting modules during operation of the system, the module comprising:
   a carrier having an inside and an outside, and adapted to fit within the compartment in the chassis;
   a component mounted in the carrier;
   a connector coupled to the component and the outside of the carrier, including at least one connection element adapted to mate with a corresponding element in the chassis upon engagement of the module; and
   means, coupled with the carrier, for engaging and disengaging the component with the system, wherein the means for engaging and disengaging the component comprises:
   a handle arm coupled to the carrier to be pivotal between an extended position and an inserted position with respect to the carrier, the handle arm defining a travel guide;
   a hub rotatably coupled with the carrier and having a protrusion engaging the travel guide;
   a first lever arm coupled to the hub and extending toward a lateral edge of the carrier; and
   a first engagement member coupled to the first lever arm, coupled to the carrier by a fulcrum and positioned with respect to the lateral edge of the carrier to engage the chassis when the handle arm is moved to the inserted position.

2. The module of claim 1, wherein movement of the handle arm toward the inserted position rotates the hub and directs the first lever arm to rotate the engagement member to engage the chassis.

3. The module of claim 1, wherein the chassis includes an insertion stop and an extraction stop and the first engagement member includes a catch and which engages the extraction stop as the handle arm is moved toward the inserted position.

4. The module of claim 1, further comprising:
   a second lever arm coupled to the hub and extending toward an opposing lateral edge of the carrier; and
   a second engagement member coupled to the second lever arm, coupled to the carrier by a fulcrum and positioned with respect to an opposing lateral edge of the carrier to engage the chassis when the handle arm is moved to the inserted position.

5. A module for a computer system, the system including a chassis having at least one compartment for accepting the module, and processing resources associated with removing and inserting modules during operation of the system, the module comprising:
   a carrier having an inside and an outside, and adapted to fit within the compartment in the chassis;
   a component mounted in the carrier;
   a connector coupled to the component and the outside of the carrier, including at least one connection element adapted to mate with a corresponding element in the chassis upon engagement of the module; and
   means, coupled with the carrier, for engaging and disengaging the component with the system, wherein the means for engaging and disengaging the component comprises:
   first and second engagement members positioned on opposing lateral edges of the carrier, and a structure adapted to apply a substantially balanced force to the first and second engagement members.

6. The module of claim 5, wherein the means for engaging and disengaging the component leverages an insertion force applied to the carrier to mate the connector with the corresponding elements in the chassis.

7. A module for a computer system, the system including a chassis having at least one compartment for accepting the module, and processing resources associated with removing and inserting modules during operation of the system, the module comprising:
   a carrier having an inside and an outside, and adapted to fit within the compartment in the chassis;
   a component mounted in the carrier;
   a connector coupled to the component and the outside of the carrier, including at least one connection element adapted to mate with a corresponding element in the chassis upon engagement of the module;
   means, coupled with the carrier, for engaging and disengaging the component with the system; and,
   a lock coupled with the means for engaging and disengaging in communication with the processing resources which prevents the disengagement of the carrier absent an enable signal provided by the processing resources.

8. An assembly for engaging a component to a computer system, the assembly comprising:
   a carrier adapted to retain the component and to be inserted within a chassis of the computer system;
   a handle arm coupled to the carrier;
   a detector coupled to the carrier and the handle arm, the detector detecting movement to actuate a lock; and
   a lock coupled to the carrier and to the detector, the lock blocking movement of the carrier toward a distal position when in an engaged state.

9. The assembly of claim 8, further comprising:
   logic associated with a computer system and coupled to the lock to selectively override the detector and de-actuate the lock when the component is ready for removal.

10. The assembly of claim 9, wherein the detector provides a signal to actuate the lock and the logic provides a control signal to selectively de-actuate the lock.

11. The assembly of claim 9, wherein the coupling of the detector to the handle arm comprises:
   a handle mounted on the handle arm; and
   a trigger mounted on the handle, the trigger having a released position in which it is biased and a depressed position, the trigger applying a force to the detector when the trigger is in its released position.

12. The assembly of claim 11, wherein the detector is coupled to the trigger by a detector surface having a biased distal end that extends to meet the trigger, the biased distal end having a raised position in which it is biased and a depressed position, the biased distal end being coupled to actuate the lock when in its raised position.

13. The assembly of claim 9, wherein the logic includes resources for receiving a request to remove the component and resources for determining whether the component is ready for removal from the computer system.

14. The assembly of claim 9, wherein the logic is coupled to a graphic user interface for receiving a request to remove the component.

15. The assembly of claim 9, further comprising an indicator light proximate to the carrier and coupled to the logic, wherein the logic includes resources for enabling the indicator light when the component is ready for removal from the computer system.

16. The assembly of claim 8, wherein the lock comprises a cam and a solenoid.

17. The assembly of claim 8, wherein the lock comprises:
   a solenoid secured to the carrier and having a rod, the rod being slidable between an extended position in which it is biased and a retracted position; and
   a cam secured to the handle arm and movable between a locked position for resisting movement of the handle arm and an extended position, the cam adapted to engage the rod and move into the unlocked position when the rod is in the extended position.

18. The assembly of claim 17, wherein the cam is pivotal in a plane that is substantially parallel to the handle arm, the cam being pivotal between a locked position and a retracted position.

19. An assembly for engaging a component to a computer system, the assembly comprising:
   a carrier having a front end and a back end, the carrier adapted to be inserted within a chassis;
   a component mounted in the carrier;
   a connector coupled with the component, including at least one connector element adapted to mate with a corresponding element associated with the computer system;
   a handle arm defining a travel guide and coupled to the carrier to be pivotal between an extended position and an inserted position with respect to the carrier;
   a hub rotatably coupled with the carrier and having a protrusion engaging the travel guide;
   a first lever arm coupled to the hub and extending toward a lateral edge of the carrier; and
   a first engagement member coupled to the first lever arm, coupled to the carrier by a fulcrum and positioned with respect to the lateral edge of the carrier to engage the chassis when the handle arm is moved to the inserted position;
   a lock coupled to the handle arm to prevent movement of the handle arm when the lock is engaged; and
   a detector coupled to the lock and the handle arm, the detector detecting movement to actuate the lock.

20. The assembly of claim 19, further comprising:
   logic associated with the computer system and coupled to the lock to selectively override the detector and de-actuate the lock when the component is ready for removal.

21. The assembly of claim 20, wherein the lock comprises a cam and a solenoid.

22. The assembly of claim 21, wherein the cam is pivotal along a plane that is substantially parallel to the handle arm, the cam being pivotal between a locked position and a retracted position.

23. The assembly of claim 21, wherein the logic includes resources for receiving a request to remove the component and resources for determining when the component is ready for removal from computer system.

24. The assembly of claim 23, further comprising an indicator light proximate to the carrier and coupled to logic, wherein the logic includes resources for enabling the indicator light when the component is ready for removal from the computer system.

25. The assembly of claim 21, wherein the logic is coupled to a graphic user interface for receiving a request to remove the component.

26. The assembly of claim 19, further comprising:
   logic associated with the computer system to provide a control signal to the lock to selectively de-actuate a lock when the component is ready for removal.

27. The assembly of claim 19, wherein movement of the handle arm toward the inserted position rotates the hub and directs the first lever arm to rotate the engagement member to engage the chassis.

28. The assembly of claim 19, wherein the chassis includes an insertion stop and an extraction stop and the first engagement member includes a catch which engages the extraction stop as the handle arm is moved toward the inserted position.

29. The assembly of claim 19, further comprising:
   a second lever arm coupled to the hub and extending toward an opposing lateral edge of the carrier; and
   the second engagement member coupled to the second lever arm, coupled to the carrier by a fulcrum and positioned with respect to an opposing lateral edge of the carrier to engage the chassis when the handle arm is moved to the inserted position.

30. The assembly of claim 19, wherein the coupling of the detector to the handle arm comprises:
   a handle mounted on the handle arm; and
   a trigger mounted on the handle, the trigger having a released position in which it is biased and a depressed position, the trigger applying a force to the detector when the trigger is in its released position.

31. The assembly of claim 30, wherein the detector is coupled to the trigger by a detector surface having a biased distal end that extends to meet the trigger, the biased distal end having a raised position in which it is biased and a depressed position, the biased distal end being coupled to actuate the lock when in its raised position.

32. The assembly of claim 19, wherein the lock comprises:
   a solenoid secured to the carrier and having a rod, a rod being slidable between an extended position in which it is biased and a retracted position; and
   a cam secured to the handle arm and pivotable between a locked position for resisting movement of the handle arm and an unlocked position, the cam adapted to engage the rod and pivot to the unlocked position when the rod is in the extended position.

33. An assembly for engaging a component to a computer system having a chassis, the assembly comprising:
- a carrier adapted to retain the component and to be inserted within the chassis to couple the component to a connector associated with the computer system;
- a lock coupled to the carrier to prevent removal of the carrier from the chassis when the lock is engaged; and
- logic associated with the computer system to determine whether the component is ready to be disengaged from computer system, logic being coupled to the lock to selectively engage or disengage a lock when the computer system is operational.

34. The assembly of claim 33, further comprising a handle arm coupled to the carrier and a detector coupled to the lock for detecting a removal force applied to the handle arm.

35. The assembly of claim 34, further comprising:
- a handle mounted on the handle arm;
- a trigger mounted on the handle, the trigger having a released position in which it is biased and a depressed position, the trigger applying force to the detector when the trigger is in its released position.

36. The assembly of claim 35, wherein the detector is coupled to the trigger by a detector surface having a biased distal end that extends to meet the trigger, the biased distal end having a raised position in which is biased and a depressed position, the biased distal end being coupled to actuate a lock in its raised position.

37. A module for a computer system, the system including a chassis having at least one compartment for accepting the module, and processing resources associated with removing and inserting modules during operation of the system, the module comprising:
- a carrier having an inside and outside, and adapted to fit within the compartment in the chassis;
- a component mounted in the carrier;
- a connector coupled to the component and the outside of the carrier, including at least one connection element adapted to mate with a corresponding element in the chassis upon engagement of the module;
- a handle arm coupled to the carrier to be pivotal between an extended position, and an intermediate position, and an inserted position with respect to the carrier;
- a translation mechanism to translate movement of the handle arm from the intermediate position to the extended position into force causing disengagement of the module from the chassis;
- a detector coupled with the handle arm which detects movement of the handle arm between the inserted position and the intermediate position;
- a lock coupled with the carrier and the handle arm, having a locked state preventing movement of the handle arm past an intermediate position and an unlocked state allowing movement to the extended position; and
- logic coupled with processing resources and the detector, which causes the lock to enter the locked state upon detection of motion between the inserted position and the intermediate position, and which causes the lock to enter the unlocked state upon receipt of a signal from the processing resources.

38. The module of claim 37, wherein the translation mechanism includes a hub which rotates upon movement of the handle arm between the intermediate position and the inserted position.

39. The module of claim 37, wherein the lock assumes the unlocked state when not powered.

40. The module of claim 37, wherein the handle arm defines a travel guide and the translation mechanism includes a hub having a protrusion engaging the travel guide and a first lever arm extending toward a lateral edge of the carrier, wherein movement of the handle arm toward the inserted position rotates the hub and directs the first lever arm to apply force for engagement with the chassis.

41. The module of claim 40, wherein the translation mechanism includes an engagement member having a catch which engages a stop mounted on the chassis as the handle is moved toward the inserted position.

42. The assembly of claim 37, further comprising a detector coupled to the lock for detecting a removal force applied to the handle arm.

43. The assembly of claim 37, further comprising a trigger arm mounted on the handle arm, the trigger having a first position in which it is biased and a second position, the trigger arm engaging the detector in its first position when the handle arm is rotated toward its extended position.

44. The assembly of claim 43, wherein the detector is coupled to the trigger by a detector surface having a biased distal end that extends to meet the trigger, the biased distal end having a raised position in which it is biased and a depressed position, the biased distal end being coupled to actuate a lock in its raised position.

45. The assembly of claim 37, wherein the lock comprises a cam and a solenoid.

46. The assembly of claim 37, wherein the lock comprises:
- a solenoid secured to the carrier and having a rod which is slidable between an extended position in which it is biased and a retracted position; and
- a cam secured to the handle arm and movable between the locked position for resisting movement of the handle arm and an extended position, the cam adapted to engage the rod and move into the unlocked position when the rod is in the extended position.

47. The assembly of claim 46, wherein the cam is pivotal along the plane that is substantially parallel to the handle arm, the cam being pivotal between a locked position and a retracted position.

48. The assembly of claim 45, wherein the logic includes resources for receiving a request to remove the component and resources for determining when the component is ready for removal from the computer system.

49. The assembly of claim 48, further comprising an indicator light mounted proximate to the carrier and coupled to the logic, wherein the logic includes resources for enabling the indicator light when the component is ready for removal from the computer system.

50. The assembly of claim 45, wherein the logic is coupled to a graphical user interface for receiving a request to remove the component.

* * * * *